US012749157B2

(12) United States Patent
He et al.

(10) Patent No.: US 12,749,157 B2
(45) Date of Patent: Sep. 29, 2026

(54) METHOD FOR TRAINING FACE SWAP MODEL, COMPUTER DEVICE, AND STORAGE MEDIUM

(71) Applicant: TENCENT TECHNOLOGY (SHENZHEN) COMPANY LIMITED, Shenzhen (CN)

(72) Inventors: Keke He, Shenzhen (CN); Junwei Zhu, Shenzhen (CN); Ying Tai, Shenzhen (CN); Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 117 days.

(21) Appl. No.: 18/813,534

(22) Filed: Aug. 23, 2024

(65) Prior Publication Data

US 2025/0054108 A1 Feb. 13, 2025

Related U.S. Application Data

(63) Continuation of application No. PCT/CN2023/124045, filed on Oct. 11, 2023.

(30) Foreign Application Priority Data

Nov. 22, 2022 (CN) ........................ 202211468062.6

(51) Int. Cl.
*G06T 5/50* (2006.01)
*G06T 9/00* (2006.01)
(Continued)

(52) U.S. Cl.
CPC .................. *G06T 5/50* (2013.01); *G06T 9/00* (2013.01); *G06V 10/761* (2022.01);
(Continued)

(58) Field of Classification Search
CPC .. G06F 18/00; G06N 3/08; G06T 5/50; G06T 9/00; G06T 2207/20084;
(Continued)

(56) References Cited

U.S. PATENT DOCUMENTS

2023/0081982 A1 3/2023 He et al.
2024/0161465 A1 5/2024 He et al.

FOREIGN PATENT DOCUMENTS

CN 111353546 A 6/2020
CN 111401216 A 7/2020
(Continued)

OTHER PUBLICATIONS

The State Intellectual Property Office of the People's Republic of China (SIPO) Office Action 1 for 202211468062.6 Jan. 12, 2023 10 Pages (including translation).
(Continued)

*Primary Examiner* — Stacy Khoo
(74) *Attorney, Agent, or Firm* — Anova Law Group, PLLC

(57) ABSTRACT

A method for training a face swap model includes concatenating an expression feature of a template image and an identity feature of a source face image to obtain a combined feature; performing encoding based on the source face image and the template image to obtain an encoding feature required for face swap; fusing the encoding feature and the combined feature to obtain a fused feature; performing decoding based on the fused feature to obtain a swapped face image; respectively predicting image attribute discrimination results of the swapped face image and a reference image by using a discriminator network of the face swap model; and calculating a difference between an expression feature of the swapped face image and the template image, calculating a difference between an identity feature of the
(Continued)

swapped face image and the source face image, and updating the generator network and the discriminator network.

18 Claims, 12 Drawing Sheets

(51) Int. Cl.
*G06V 10/74* (2022.01)
*G06V 10/80* (2022.01)
*G06V 40/16* (2022.01)

(52) U.S. Cl.
CPC .......... *G06V 10/806* (2022.01); *G06V 40/171* (2022.01); *G06V 40/174* (2022.01); *G06T 2207/20084* (2013.01); *G06T 2207/20221* (2013.01); *G06T 2207/30201* (2013.01)

(58) Field of Classification Search
CPC ........... G06T 2207/20221; G06T 2207/30201; G06V 10/761; G06V 10/774; G06V 10/806; G06V 10/82; G06V 40/168; G06V 40/171; G06V 40/172; G06V 40/174
See application file for complete search history.

(56) References Cited

FOREIGN PATENT DOCUMENTS

| | | | |
|---|---|---|---|
| CN | 111523413 | A | 8/2020 |
| CN | 111553267 | A | 8/2020 |
| CN | 111783603 | A | 10/2020 |
| CN | 112766160 | A | 5/2021 |
| CN | 113705290 | A | 11/2021 |
| CN | 114387656 | A | 4/2022 |
| CN | 115171199 | A | 10/2022 |
| CN | 115565238 | A | 1/2023 |
| WO | 2021258920 | A1 | 12/2021 |

OTHER PUBLICATIONS

What is the core technology of AI face-changing What other application, Microsoft Research Asia, Zhihu, Sep. 6, 2019.

The World Intellectual Property Organization (WIPO) International Search Report for PCT/CN2023/124045 Jan. 20, 2024 7 Pages (including translation).

Generative Adversarial Architecture—Baidu Encyclopedia, https://baike.baidu.com/item/Gan/22181905, May 17, 2022 (May 17, 2022) 5 Pages (including translation).

METHOD FOR TRAINING FACE SWAP MODEL, COMPUTER DEVICE, AND STORAGE MEDIUM

CROSS-REFERENCES TO RELATED APPLICATIONS

This application is a continuation application of PCT Patent Application No. PCT/CN2023/124045, filed on Oct. 11, 2023, which claims priority to Chinese Patent Application No. 2022114680626, filed Nov. 22, 2022, all of which is incorporated herein by reference in their entirety.

FIELD OF THE TECHNOLOGY

The present disclosure relates to the field of computer technologies and, in particular, to a method and apparatus for training a face swap model, a computer device, a storage medium, and a computer program product.

BACKGROUND OF THE DISCLOSURE

With the rapid development of computer and artificial intelligence technologies, face replacement technology has been emerged. Face replacement, also referred to as face swap, refers to replacing a face in a to-be-face-replaced image (e.g., a template image) with a face in a source face image. One objective of a face swap technology is to ensure that a face in a swapped face image may retain an expression, an angle, a background, and other information of the face in the template image, and may further be as similar as possible to the face in the source face image. There are many application scenarios applied for the face replacement. For example, video face swap may be applied to film and television portrait production, game character design, a virtual image, and privacy protection.

A capability for retaining diverse expressions is important and difficult for the face replacement technology. Currently, most face swap algorithms may achieve satisfactory effects in a common expression scenario, such as a smiling scenario. However, in some scenarios with diverse expressions, such as pouting, eyes closing, single eye blinking, and getting angry, an expression retention effect of a swapped face image is not desirable, and even some difficult expressions cannot be retained. This affects accuracy of face swap on a face image and results in a poor face swap effect.

SUMMARY

One aspect of the present disclosure includes a method for training a face swap model, performed by a computer device. The method includes acquiring a sample triplet, the sample triplet comprising a source face image, a template image, and a reference image; concatenating an expression feature of the template image and an identity feature of the source face image to obtain a combined feature; performing encoding based on the source face image and the template image by using a generator network of the face swap model to obtain an encoding feature required for face swap; fusing the encoding feature and the combined feature to obtain a fused feature; performing decoding based on the fused feature by using the generator network of the face swap model to obtain a swapped face image; respectively predicting an image attribute discrimination result of the swapped face image and an image attribute discrimination result of the reference image by using a discriminator network of the face swap model, an image attribute comprising forged image and non-forged image; and calculating a difference between an expression feature of the swapped face image and the expression feature of the template image, calculating a difference between an identity feature of the swapped face image and an identity feature of the source face image, and updating the generator network and the discriminator network, based on the image attribute discrimination result of the swapped face image and the image attribute discrimination result of the reference image, the calculated difference of the expression features between the swapped face image and the template image, and the calculated difference of the identity features between the swapped face image and the source face image.

Another aspect of the present disclosure includes a computer device. The computer device includes one or more processors and a memory containing a computer-executable program that, when being executed, causes the one or more processors to perform: acquiring a sample triplet, the sample triplet comprising a source face image, a template image, and a reference image; concatenating an expression feature of the template image and an identity feature of the source face image to obtain a combined feature; performing encoding based on the source face image and the template image by using a generator network of the face swap model to obtain an encoding feature required for face swap; fusing the encoding feature and the combined feature to obtain a fused feature; performing decoding based on the fused feature by using the generator network of the face swap model to obtain a swapped face image; respectively predicting an image attribute discrimination result of the swapped face image and an image attribute discrimination result of the reference image by using a discriminator network of the face swap model, an image attribute comprising forged image and non-forged image; and calculating a difference between an expression feature of the swapped face image and the expression feature of the template image, calculating a difference between an identity feature of the swapped face image and an identity feature of the source face image, and updating the generator network and the discriminator network, based on the image attribute discrimination result of the swapped face image and the image attribute discrimination result of the reference image, the calculated difference of the expression features between the swapped face image and the template image, and the calculated difference of the identity features between the swapped face image and the source face image.

Another aspect of the present disclosure includes a non-transitory computer-readable storage medium, storing a computer-executable instruction that, when being executed, causes one or more processors to perform: acquiring a sample triplet, the sample triplet comprising a source face image, a template image, and a reference image; concatenating an expression feature of the template image and an identity feature of the source face image to obtain a combined feature; performing encoding based on the source face image and the template image by using a generator network of the face swap model to obtain an encoding feature required for face swap; fusing the encoding feature and the combined feature to obtain a fused feature; performing decoding based on the fused feature by using the generator network of the face swap model to obtain a swapped face image; respectively predicting an image attribute discrimination result of the swapped face image and an image attribute discrimination result of the reference image by using a discriminator network of the face swap model, an image attribute comprising forged image and non-forged image; and calculating a difference between an expression feature of the swapped face image and the expression feature of the template image, calculating a difference between an identity feature of the swapped face image and an identity feature of the source face image, and updating the generator network and the discriminator network, based on the image attribute discrimination result of the swapped face image and the image attribute discrimination result of the reference image, the calculated difference of the expression features between the swapped face image and the template image, and the calculated difference of the identity features between the swapped face image and the source face image.

Details of one or more embodiments of the present disclosure are provided in the accompanying drawings and descriptions below. Other features and advantages of the present disclosure become apparent from the specification, the accompanying drawings, and the claims.

BRIEF DESCRIPTION OF THE DRAWINGS

To describe the technical solutions in embodiments of the present disclosure or in related art more clearly, the accompanying drawings required for describing embodiments or related art are briefly described below. Apparently, the accompanying drawings in the following description show merely some embodiments of the present disclosure, and a person of ordinary skill in the art may still obtain other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings and embodiments. The specific embodiments described herein are merely used for explaining the present disclosure, and are not used for limiting the present disclosure.

Supervised learning is a machine learning task in which an algorithm may learn or establish a pattern from a labeled training set and infer a new instance based on the pattern. The training set includes a series of training examples, and each training example (or referred to as a sample) includes input and supervision information (that is, expected output, also referred to as labeling information). Output that the algorithm infers based on the input may be a continuous value or a categorical label.

Unsupervised learning is a machine learning task. An algorithm learns a pattern, a structure, and a relationship from unlabeled data to discover hidden information and a meaningful structure in the data. Unlike the supervised learning, there is no supervision information in the unsupervised learning to guide a learning process, and the algorithm needs to discover an inherent pattern of the data on its own.

Generative adversarial network (i.e., GAN): It is a method of the unsupervised learning to learn by allowing two neural networks compete with each other. The generative adversarial network includes a generator network and a discriminator network. The generator network randomly samples from latent space as input, and an output result of the generator network needs to imitate samples in a training set as much as possible. In other words, a training goal of the generator network is to generate a sample that is as similar as possible to the samples in the training set. Input of the discriminator network is output of the generator network. An objective of the discriminator network is to distinguish the sample outputted by the generator network from the samples in the training set as much as possible. In other words, a training goal of the discriminator network is to distinguish the sample generated by the generator network from the samples in the training set. The generator network needs to deceive the discriminator network as much as possible. The two networks compete with each other and continuously update parameters, and finally the generator network can generate a sample that is very similar to the samples in the training set.

Figure 1:
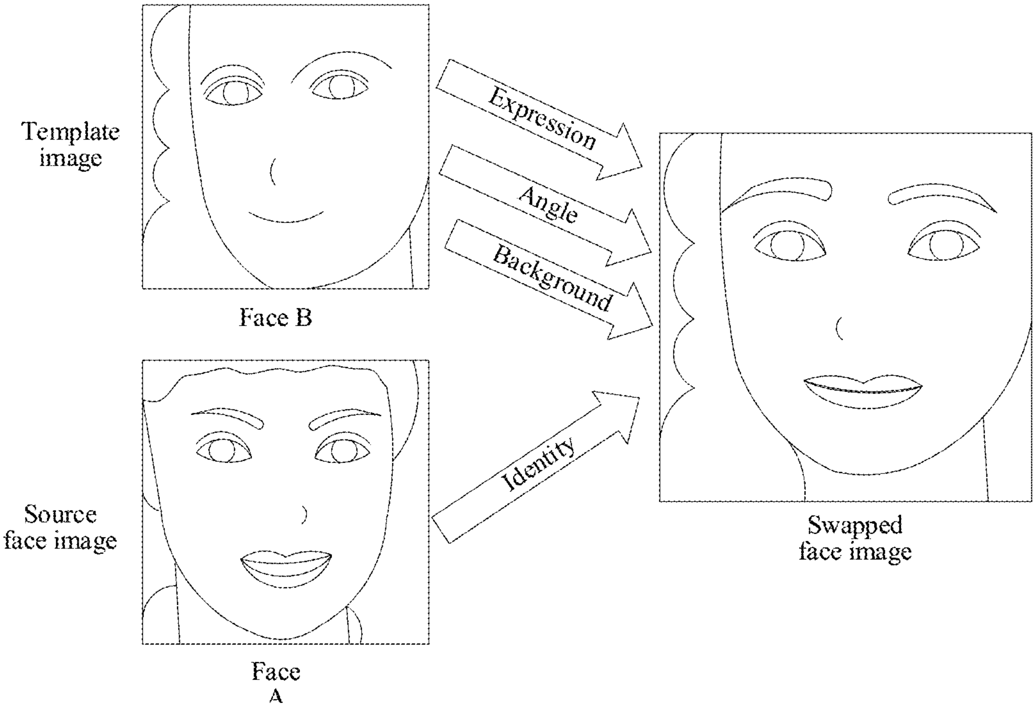
FIG. 1 is a schematic diagram of image face swap according to an embodiment of the present disclosure.

Face swap: It is to swap a face in an inputted source face image onto a template image, output a swapped face image, and allow the outputted swapped face image to retain an expression, an angle, a background, and another information of the template image. As shown in FIG. 1, a face in an inputted source face image in a face swap process is face A, and a face in a template image is face B. A photo in which face B in the template image is replaced with face A is outputted through face swap.

Face swap model: It is a machine learning model implemented by using deep learning and a face recognition technology, which may extract a facial expression, the eyes, the mouth, and another feature of a person from a photo or a video and match these features with a facial feature of another person.

There are many application scenarios for video face swap, for example, film and television portrait production, game character design, a virtual image, and privacy protection. In film and television production, when an actor is unable to perform a professional action, a professional may complete the action first, and then a face swap technology may be used to automatically swap the face of the professional to the face of the actor in post production. When an actor needs to be replaced, a new face may be swapped by using the face swap technology, so that there is no need to photograph again, and can save a lot of costs. In virtual image design, for example, in a livestreaming scenario, a user may swap the face of the user to a virtual character, to improve fun of the livestreaming and protect personal privacy. A result of the video face swap may also provide adversarial attack training materials for a service such as face recognition.

GT (i.e., ground truth) is also referred to as reference information, labeled information, or supervision information.

Currently, a face swap model is trained by using a complex-designed face swap network, and a satisfactory effect can be achieved in a common expression scenario, such as a smiling scenario. However, in some scenarios with diverse expressions, such as pouting, closing eyes, blinking one eye, and angry, an expression retention effect of a swapped face image is not good, and even some difficult expressions cannot be retained, resulting in a poor face swap effect.

Figure 2:
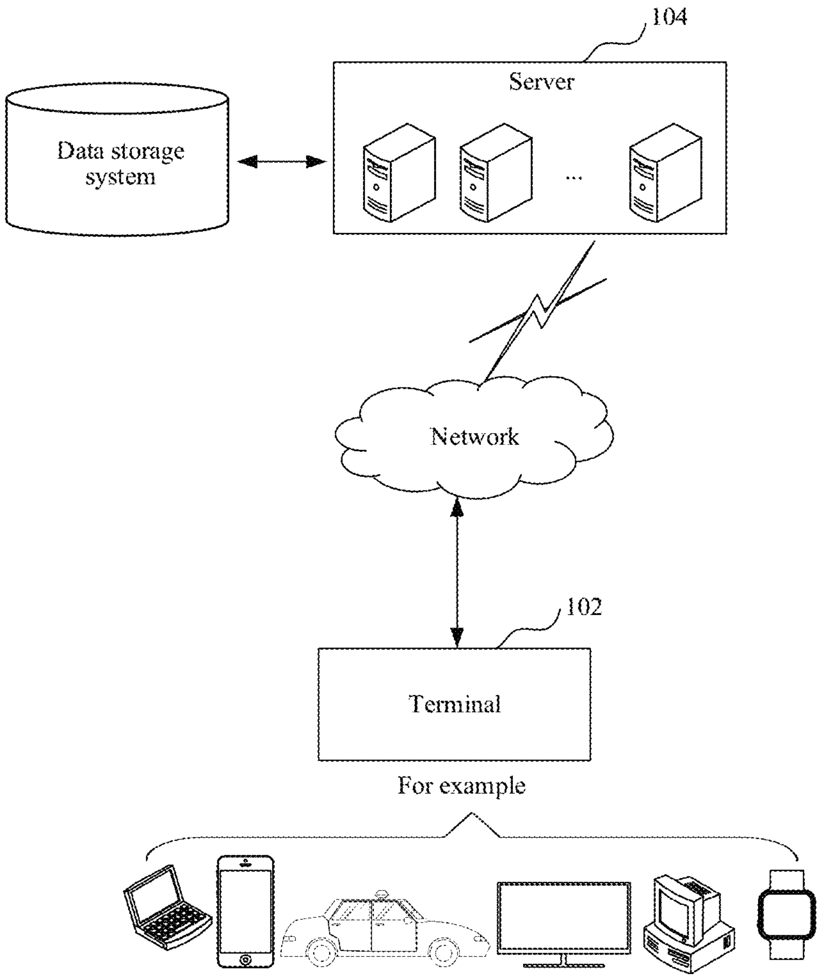
FIG. 2 is a diagram of an application environment of a method for training a face swap model according to an embodiment of the present disclosure.

A method for training a face swap model provided in an embodiment of the present disclosure may be applied to an application environment shown in FIG. 2. A terminal 102 communicates with a server 104 over a network. A data storage system may store data that needs to be processed by the server 104. The data storage system may be integrated on the server 104, or put on a cloud or another server. The terminal 102 may be, but is not limited to, a personal computer, a notebook computer, a smartphone, a tablet, an Internet of Things device, or a portable wearable device. The Internet of Things device may be a smart speaker, a smart television, a smart air conditioner, a smart on-board device, or the like. The portable wearable device may be a smartwatch, a smart band, a head-mounted device, or the like. The server 104 may be implemented by using an independent server or a server cluster that includes a plurality of servers.

In an embodiment, the terminal 102 may include an application client, and the server 104 may be a backend server providing a service for the application client. The application client may send an image or a video collected by the terminal 102 to the server 104. After obtaining a trained face swap model by using the method for training a face swap model provided in the present disclosure, the server 104 may swap a face in the image or the video collected by the terminal 102 to another face or virtual image by using a generator network of the trained face swap model, and then return a swapped face image or video to the terminal 102 in real time. The terminal 102 displays the swapped face image or video by using the application client. The application client may be a video client, a social application client, an instant messaging client, or the like.

Figure 3:
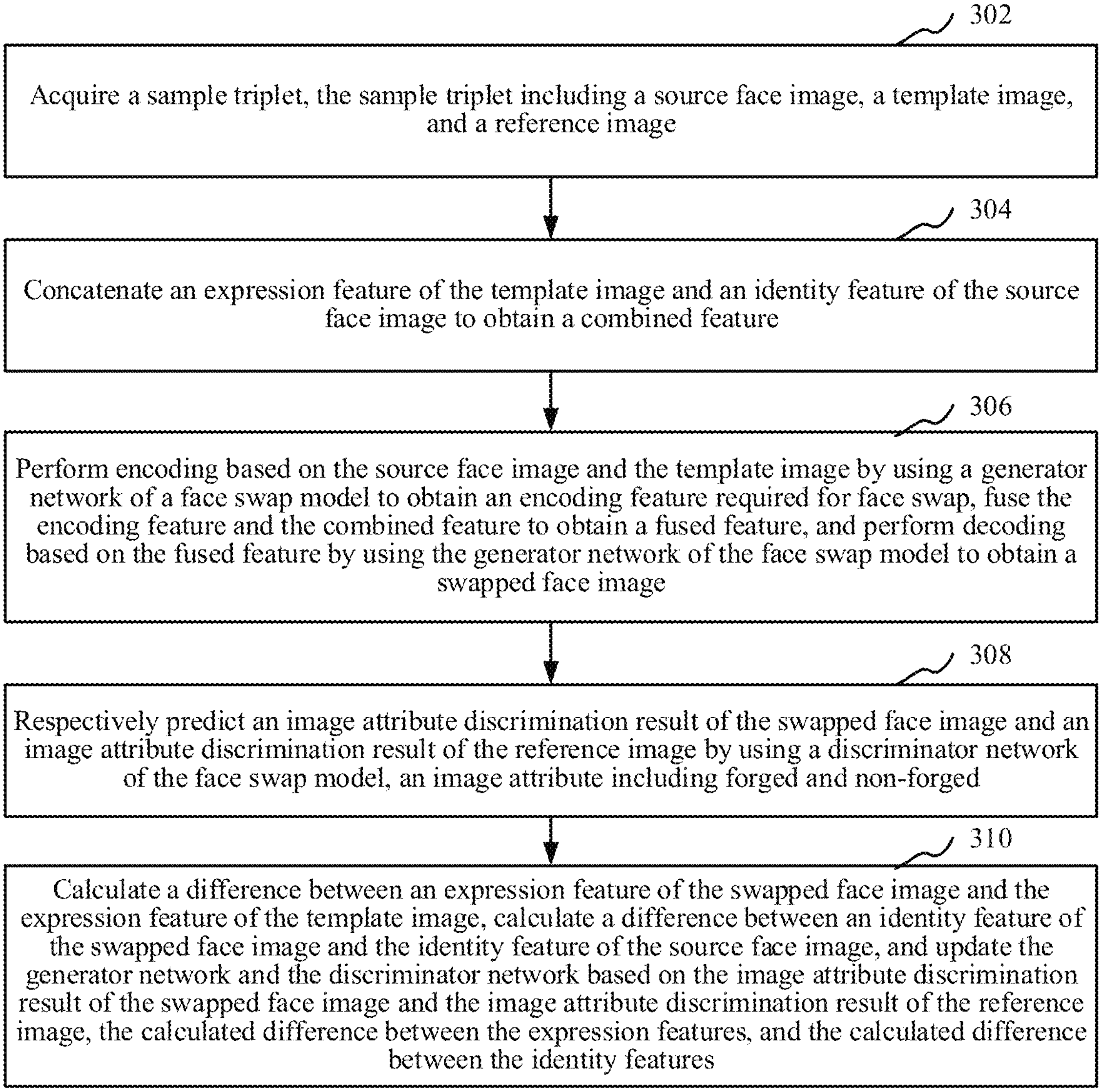
FIG. 3 is a schematic flowchart of a method for training a face swap model according to an embodiment of the present disclosure.

FIG. 3 is a schematic flowchart of a method for training a face swap model according to an embodiment of the present disclosure. This embodiment may be performed by a computer device or a computer device cluster including a plurality of computer devices. The computer device may be a server, or may be a terminal. Therefore, this embodiment of the present disclosure may be performed by the server, or may be performed by the terminal, or may be performed by both the server and the terminal. An example in which this embodiment of the present disclosure is performed by the server is used for description. The method includes the following operations.

Operation 302: Acquire a sample triplet, the sample triplet including a source face image, a template image, and a reference image.

In the present disclosure, the face swap model includes a generator network and a discriminator network. The face swap model is trained by a generative adversarial network (GAN for short) formed by the generator network and the discriminator network. Specific content is introduced later.

In the present disclosure, the sample triplet is sample data configured for training the face swap model. The server may obtain a plurality of sample triplets for training the face swap model. Each sample triplet includes a source face image, a template image, and a reference image. The source face image is an image that provides a face, and may be denoted as source. The template image is an image that provides information such as a facial expression, a posture, and an image background, and may be denoted as template. Face swap is to replace a face in the template image with the face in the source face image. In addition, a swapped face image may retain the expression, posture, image background, and the like of the template image. The reference image is an image used as supervision information for training the face swap model and may be denoted as GT. Because principles of using each sample triple (or a batch of sample triplets) to train the face swap model are the same, a process of training the face swap model by using one sample triplet is used as an example herein for description.

Based on a definition of face swap, for each sample triplet, the reference image configured for providing the supervision information required for model training is to have the same identity attribute as the source face image and the same non-identity attribute as the template image. In addition, to ensure a face swap effect, the source face image and the template image are to have different identity attributes. A face is usually unique. An identity attribute refers to an identity represented by a face in an image. Having the same identity attribute refers to that faces in images are the same. A non-identity attribute refers to a posture, an expression, and makeup of a face in an image. The non-identity attribute further includes an image style, a background, and another attribute.

For example, in a video face swap scenario, the face in the source face image and the face in the reference image are the faces of the same person, but facial expressions, makeup, postures of the person, and backgrounds in the two images may be partially the same or different. The face in the source face image and the face in the template image are the faces of two different persons. The source face image and the reference image may alternatively be the same image.

In an embodiment, the sample triple may be constructed in the following manner: acquiring a first image and a second image, the first image and the second image corresponding to the same identity attribute and corresponding to different non-identity attributes, and acquiring a third image, the third image and the first image corresponding to different identity attributes; and replacing an object in the second image with an object in the third image to obtain a fourth image, and constructing a sample triplet by using the first image as a source face image, the fourth image as a template image, and the second image as a reference image.

Specifically, the server may randomly obtain the first image, determine identity information corresponding to a face in the first image, and then acquire another image corresponding to the identity information as the second image. Therefore, the first image and the second image have the same face, in other words, have the same identity attribute. Then, the server may randomly acquire the third image, where the third image and the first image correspond to different identity attributes. In other words, a face in the third image and the face in the first image are not the face of the same person. The server may input the second image and the third image into the face swap model, and replace a face in the second image with the object in the third image by using the generator network of the face swap model to obtain the fourth image, and the fourth image retains an expression, a posture, an image background, and another feature of the second image. The first image, the second image, and the third image each are an image including a face, and the server may randomly acquire these images from a face image dataset.

For example, the first image includes the face of man A, and a facial expression of man A in the first image is laughing, and an image background is background 1. The second image includes the face of man A, and a facial expression in the second image is smiling, and an image background is background 2. The third image includes the face of woman B, and a facial expression in the third image is angry, and an image background is background 3. Apparently, the face of man A is different from the face of woman B. In other words, the third image has the different face from the first image and the second image. The server replaces the face of man A in the second image with the face of woman B to obtain the fourth image. An expression of the fourth image retains the smiling expression in the second image, and a background retains image background 2. Therefore, the first image is used as the source face image, to be specific, the first image provides the face of man A, the laughing expression, and image background 1, the fourth image is used as the template image and provides the face of woman B, the smiling expression, and image background 2, and the second image is used as the reference image and provides the face of man A, the smiling expression, and image background 2, to construct the sample triplet. It can be learned that the reference image is a real image, not a forged or synthetic image.

In this embodiment, the second image used as the reference image is a real image, not a forged image. The reference image is used as a reference, so that a swapped face image outputted by the generator network is continuously close to the real reference image, thereby ensuring that the outputted swapped face image can maintain consistency and smoothness with a non-synthetic part in terms of shape, lighting, movement, and the like, to obtain a high-quality swapped face image or video with a good face swap effect.

In an embodiment, after acquiring the foregoing sample triplet, the server may directly input the sample triplet into the face swap model to train the face swap model.

In an embodiment, after acquiring the foregoing sample triplet, the server first respectively preprocesses the three images in the sample triplet, and uses preprocessed images to train the face swap model. Specifically, preprocessing may include the following aspects: 1. Because the face in an image generally only occupies a part of the image, the server may first perform face detection on the image to obtain a face area. For a face detection network or a face detection algorithm required for the face detection, a pre-trained neural network model may be used. 2. Facial key point detection, indicating that key point detection is performed in the face area to obtain key points of the face, such as key points of the eyes, the mouth corners, and the facial contour. 3. Face alignment, indicating that the face is uniformly "straightened" and aligned based on recognized key points by using affine transformation, errors caused by different postures are eliminated as much as possible, and a face image is cropped after face alignment.

In one embodiment, the server can acquire a cropped source face image, template image, and reference image through the foregoing preprocessing operations, input the cropped images into the face swap model, where a swapped face image outputted by the face swap model only includes a face, and use the outputted swapped face image to replace a face area in the template image, to obtain a final outputted swapped face image. In this way, a training effect for the face swap model can be ensured.

Operation 304: Concatenate an expression feature of the template image and an identity feature of the source face image to obtain a combined feature.

An expression feature of an image can reflect expression information expressed by the image, and is a feature of a facial expression on the face obtained by locating and extracting an organ feature, a texture area, and a predefined feature point of the face. The expression feature is a key to expression recognition, and determines a final expression recognition result. An identity feature of an image is a biometric feature that may be configured for identity recognition, such as a facial feature, a pupil feature, a fingerprint feature, and a palm print feature. In the present disclosure, the identity feature is a facial feature recognized based on the face of a person and may be configured for face recognition.

In an embodiment, the server may extract a feature from the template image by using an expression recognition network of the face swap model to obtain the expression feature of the template image, and extract a feature from the source face image by using a face recognition network of the face swap model to obtain the identity feature of the source face image.

In this embodiment, the face swap model includes not only the generator network and the discriminator network, but also a pre-trained expression recognition network and a pre-trained face recognition network. Both the expression recognition network and the face recognition network are pre-trained neural network models.

Expression recognition is an important research direction in the field of computer vision. The expression recognition is a process of predicting an emotion category expressed by a face by analyzing and processing a face image. A network structure of the expression recognition network is not limited in embodiments of the present disclosure. In one embodiment, the expression recognition network may be built based on a convolutional neural network (CNN). The convolutional neural network uses a convolutional layer and a pooling layer to extract a feature from an inputted face image, and performs expression classification by using a fully connection layer.

In one embodiment, the expression recognition network may be trained by using a series of pictures and corresponding expression labels. Specifically, a face image dataset including expression labels needs to be acquired. The dataset includes sample face images of different emotion categories, such as happiness, sadness, anger, blinking, single blinking, making a face, and other common and complex expressions. For the expression recognition network built based on the convolutional neural network, more abstract and advanced feature representations of the sample face image, namely, the expression features, may be gradually extracted by using a plurality of convolutional layers and pooling layers stacked in the convolutional neural network. The extracted expression features are classified by using the fully connection layer to obtain a prediction result of a facial expression in the sample face image. A loss function of the expression recognition network may be constructed based on a difference between the prediction result and an expression label of the sample face image, and a network parameter of the expression recognition network may be updated based on the loss function. For example, the network parameter of the expression recognition network may be optimized by minimizing the loss function. In this way, a plurality of updates are performed based on a plurality of sample face images, and finally a trained expression recognition network is obtained. The trained expression recognition network may be configured to extract an expression feature of an image. The expression feature in the present disclosure may be configured for constraining consistency of expressions, to be specific, constraining an expression similarity between the swapped face image and the template image. The server may directly extract the feature from the template image by using the trained expression recognition network to obtain the corresponding expression feature. The server may further perform face detection on the template image by using the expression recognition network, determine the face area in the template image based on a detection result, and then extract a feature from the face area to obtain the corresponding expression feature. The expression feature of the template image may be denoted as template_exp_features.

Face recognition is biometrics that performs identity recognition based on facial feature information of a person, and is one of research challenges in the field of biometric recognition. A network structure of the face recognition network is not limited in embodiments of the present disclosure. In one embodiment, the face recognition network may be built based on the convolutional neural network (CNN). The convolutional neural network uses the convolutional layer and the pooling layer to extract the feature of the inputted face image and performs identity classification by using the fully connection layer. The face recognition network may be trained by using a series of pictures and corresponding identity labels. Specifically, the face recognition network includes a plurality of stacked convolutional layers and pooling layers as well as a fully connection layer. The convolutional layer uses a set of learnable filters (also referred to as convolutional kernels) to filter the inputted sample face image to extract a local feature in the sample face image. The pooling layer is configured for reducing a dimension of the local feature, reducing an amount of calculation, and enhancing invariance of the model to the input image. The fully connection layer maps the extracted feature to a final outputted category, such as a specific object identity in face recognition. The trained face recognition network may be configured to extract an identity feature of an image. The identity feature in the present disclosure may be configured for constraining consistency of identities, to be specific, constraining an identity similarity between the swapped face image and the source face image. The server may directly extract the feature from the source face image by using the trained face recognition network to obtain the corresponding identity feature. The server may further perform face detection on the template image by using the trained face recognition network, determine a face area in the source face image based on a detection result, and then extract a feature from the face area to obtain the corresponding identity feature. The identity feature of the source face image may be denoted as source_id_features.

The combined feature is a feature obtained by concatenating the expression feature of the template image and the identity feature of the source face image by the server. For example, the expression feature is a 1024-dimensional feature, the identity feature is a 512-dimensional feature, and a 1536-dimensional combined feature may be obtained by concatenating (concat) the two features based on a feature dimension. Certainly, a concatenation manner is not limited thereto, which is not limited in embodiments of the present disclosure. For example, a multi-scale feature fusion manner may be used to extract features of different scales from different layers of two networks and fuse the features to obtain a combined feature. The combined feature may be denoted as id_exp_features.

The combined feature obtained by the server may participate in subsequently decoding together with an encoding feature required for face swap to output the swapped face image. To be specific, in the present disclosure, during training the face swap model, an encoding feature of the template image and an encoding feature of the source face image participate in decoding to output the swapped face image, and the expression feature of the template image and the identity feature of the source face image also participate in decoding to output the swapped face image, so that the outputted swapped face image can have both expression information of the template image and identity information of the source face image. In other words, in addition to retaining the expression of the template image as much as possible, the swapped face image can also be as similar as possible to the source face image, thereby improving accuracy and a face swap effect of face swap on the face image.

Operation 306: Perform encoding based on the source face image and the template image by using the generator network of the face swap model to obtain the encoding feature required for face swap, fuse the encoding feature and the combined feature to obtain a fused feature, and perform decoding based on the fused feature by using the generator network of the face swap model to obtain the swapped face image.

Figure 4:
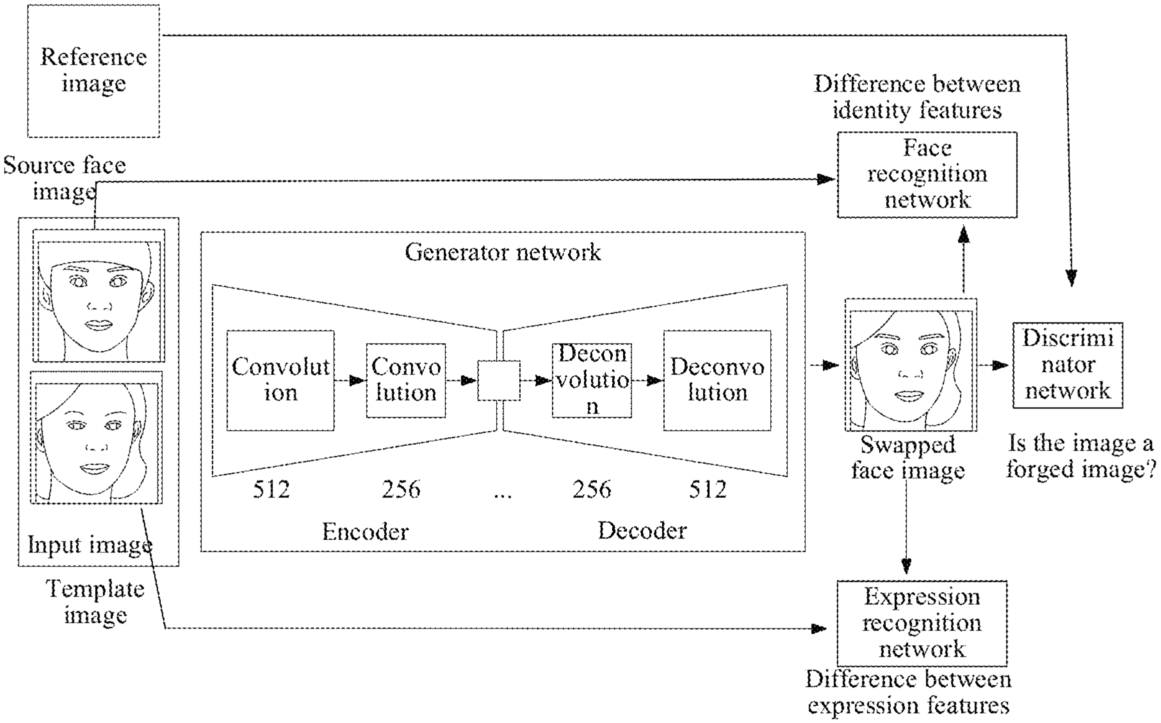
FIG. 4 is a schematic diagram of a model structure of a face swap model according to an embodiment of the present disclosure.

FIG. 4 is a schematic diagram of a model structure of a face swap model according to an embodiment. Refer to FIG. 4. The face swap model includes a face recognition network, an expression recognition network, a generator network, and a discriminator network.

In the present disclosure, the face swap model is trained by the generative adversarial network (GAN for short) formed by the generator network and the discriminator network. In an embodiment, refer to FIG. 4. The generator network includes two parts: an encoder and a decoder. The encoder continuously halves a size (resolution) of an input image through convolution calculation and gradually increase a quantity of channels. An encoding process is essentially achieved by using a convolution kernel (also referred to as a filter) on input data corresponding to the input image. The encoder includes a plurality of convolution kernels and ultimately outputs a feature vector. The decoder performs deconvolution calculation, to gradually double a size of a feature for training, gradually reduce the quantity of channels, and reconstruct or generate the image based on the feature.

In an embodiment, the performing encoding based on the source face image and the template image by using the generator network of the face swap model to obtain the encoding feature required for face swap includes: concatenating the source face image and the template image to obtain an input image, inputting the input image into the face swap model, and encoding the input image by using the generator network of the face swap model to obtain the encoding feature required for face swap on the template image.

Specifically, the source face image and the template image are both three-channel images. The server may concatenate the source face image and the template image based on the image channels. A six-channel input image obtained after concatenation is inputted into the encoder of the generator network. The input image is gradually encoded by the encoder to obtain an intermediate result in latent space, that is, the encoding feature (which may be denoted as swap_features). For example, the input image is gradually encoded from a resolution of 512*512*6 to 256*256*32, 128*128*64, 64*64*128, 32*32*256, and so on. Finally, the intermediate result is obtained in the latent space, referred to as the encoding feature, namely, swap_features. The encoding feature also has image information of the source face image and image information of the template image.

Further, the server may fuse the encoding feature and the foregoing combined feature to obtain the fused feature. The fused feature has both content of the encoding feature and a style of the combined feature.

In an embodiment, the server may respectively calculate a mean value and a standard deviation of the encoding feature and a mean value and a standard deviation of the combined feature; normalize the encoding feature based on the mean value and the standard deviation of the encoding feature to obtain a normalized encoding feature; and transfer the style of the combined feature to the normalized encoding feature based on the mean value and the standard deviation of the combined feature to obtain the fused feature.

Specifically, the server may fuse the encoding feature and the combined feature through adaptive instance normalization (AdaIN) to obtain the fused feature. A specific principle is shown by the following formula:

$$AdaIN(x, y) = \sigma(y)\left(\frac{x - \mu(x)}{\sigma(x)}\right) + \mu(y).$$

x and y are the encoding feature and the combined feature respectively, $\sigma$ and $\mu$ are a standard deviation and a mean value, respectively. The mean value and the standard deviation of the encoding feature are aligned with the mean value and the standard deviation of the combined feature by using the formula. $\mu(x)$ is the mean value of the encoding feature, $\sigma(x)$ is the standard deviation of the encoding feature, $\sigma(y)$ is the standard deviation of the combined feature, and $\mu(y)$ is the mean value of the combined feature. Both the encoding feature and the combined feature are a multi-channel two-dimensional matrix. For example, a matrix size of the encoding feature is 32*32*256. For each channel, a mean value and a standard deviation of a corresponding channel may be calculated based on values of all elements to obtain a mean value and a standard deviation of the encoding feature in each channel. The same is true for the combined feature. To be specific, for each channel of the combined feature, a mean value and a standard deviation of a corresponding channel may be calculated based on values of all elements to obtain a mean value and a standard deviation of the combined feature in each channel.

First, the server uses the mean value and the standard deviation of the encoding feature to normalize the encoding feature. To be specific, the normalized encoding feature can be obtained by subtracting the mean value of the encoding feature from the encoding feature and then dividing by the standard deviation of the encoding feature. After the encoding feature is normalized, a mean value of the normalized features is 0 and a standard deviation of the normalized features is 1, so that an original style of the encoding feature is removed and original content of the encoding feature is retained. Then, the style of the combined feature is transferred to the normalized encoding feature by using the mean value and the standard deviation of the combined feature. To be specific, the normalized encoding feature is multiplied by the standard deviation of the combined feature and then added to the mean value of the combined feature to obtain the fused feature. In this way, the obtained fused feature retains the content of the encoding feature and has the style of the combined feature.

As mentioned above, the encoding feature has both the image information of the source face image and the image information of the template image, and the combined feature has both the expression feature and the identity feature required for face swap. Therefore, the fused feature is obtained by fusing the encoding feature and the combined feature in this manner to enable the face in the decoded swapped face image to be similar to the face in the source face image, and also enable the swapped face image to retain the expression of the face, posture, and image background in the template image, thereby improving accuracy of the outputted swapped face image.

Certainly, the server may alternatively fuse the encoding feature and the combined feature in another manner, for example, batch normalization, instance normalization, and conditional instance normalization. A fusing manner is not limited in embodiments of the present disclosure.

After obtaining the fused feature, the server inputs the fused feature into the decoder of the generator network. The deconvolution calculation of the decoder is used to gradually double a resolution of the fused feature, gradually reduce a quantity of channels, and output the swapped face image. For example, the resolution of the fused feature is 32*32*256, resolutions of 64*64*128, 128*128*64, 256*256*32, 512*512*3 are outputted in sequence through the gradual deconvolution calculation of the decoder, and finally the swapped face image is outputted.

Operation 308: Respectively predict an image attribute discrimination result of the swapped face image and an image attribute discrimination result of the reference image by using the discriminator network of the face swap model, an image attribute including forged and non-forged.

Refer to FIG. 4. The face swap model further includes the discriminator network. The discriminator network is configured to determine whether an input image is a forged image or a non-forged image. After outputting the swapped face image by using the generator network, the server inputs the swapped face image into the discriminator network, extracts a feature from the inputted swapped face image by using the discriminator network to obtain low-dimensional discrimination information, and classifies image attributes based on the extracted discrimination information to obtain corresponding image attribute discrimination results. In the present disclosure, the classification performed by using the discriminator network is a binary classification of the image attributes, in other words, to discriminate whether the image is a forged image or a non-forged image. The forged image is also referred to as a synthetic image, and the non-forged image is also referred to as a real image.

In addition, the server may input the reference image in the sample triplet into the discriminator network, extract a feature from the inputted reference image by using the discriminator network to obtain low-dimensional discrimination information, and classify image attributes based on the extracted discrimination information to obtain corresponding image attribute discrimination results.

In an embodiment, obtaining the corresponding image attribute discrimination results based on the swapped face image and the reference image by using the discriminator network of the face swap model includes: inputting the swapped face image into the discriminator network of the face swap model, to obtain a first probability that the swapped face image is a non-forged image; and inputting the reference image into the discriminator network of the face swap model, to obtain a second probability that the reference image is a non-forged image. A training goal of the discriminator network is to make the first probability outputted by the discriminator network as small as possible and the outputted second probability as large as possible. In this way, the discriminator network has good performance.

Operation 310: Calculate a difference between an expression feature of the swapped face image and the expression feature of the template image, calculate a difference between an identity feature of the swapped face image and the identity feature of the source face image, and update the generator network and the discriminator network based on the image attribute discrimination result of the swapped face image and the image attribute discrimination result of the reference image, the calculated difference between the expression features, and the calculated difference between the identity features.

In the present disclosure, the face swap model includes the generator network and the discriminator network. The generator network and the discriminator network perform adversarial training based on an image attribute discrimination result of real reference data and an image attribute discrimination result of outputted forged data that are predicted by the discriminator network. In addition, in this embodiment of the present disclosure, refer to FIG. 4. To allow the outputted swapped face image to retain the facial expression of the face in the template image and the identity attribute of the source face image as much as possible, during training, the server may further calculate the difference between the expression feature of the swapped face image and the expression feature of the template image and calculate the difference between the identity feature of the swapped face image and the identity feature of the source face image, jointly construct a loss function of the entire face swap model based on the calculated differences and the image attribute discrimination result of the swapped face image and the image attribute discrimination result of the reference image outputted by the discriminator network, and optimize and update a network parameter of the generator network and a network parameter of the discriminator network with a goal of minimizing the loss function. Specific network structures of the generator network and the discriminator network are not limited in embodiments of the present disclosure, provided that the generator network supports the foregoing image reconstruction and generation capability, and the discriminator network supports the foregoing image attribute discrimination capability. In addition, the expression feature of the swapped face image may be obtained by extracting an image feature by using the foregoing expression recognition network, and the identity feature of the swapped face image may be obtained by extracting an image feature by using the foregoing face recognition network.

In an embodiment, the server alternately constructs, when the network parameter of the generator network is fixed, a discrimination loss for the discriminator network based on the first probability that the swapped face image is a non-forged image and the second probability that the reference image is a non-forged image, and updates the network parameter of the discriminator network based on the discrimination loss; and the server constructs, when the network parameter of the discriminator network is fixed, a generation loss for the generator network based on the first probability that the swapped face image is a non-forged image, constructs an expression loss based on the difference between the expression feature of the swapped face image and the expression feature of the template image, constructs an identity loss based on the difference between the identity feature of the swapped face image and the identity feature of the source face image, constructs a face swap loss for the generator network based on the generation loss, the expression loss, and the identity loss, and updates the network parameter of the generator network based on the face swap loss. This alternate process is ended when a training stop condition is satisfied, and a trained discriminator network and a trained generator network are obtained.

In this embodiment, the training of the face swap model includes two alternating stages, a first stage is to train the discriminator network, and a second stage is to train the generator network.

A training goal of the first stage is to allow the discriminator network to identify the swapped face image as a forged image as much as possible, and to allow the discriminator network to identify the reference image as a non-forged image as much as possible. Therefore, at the first stage, the parameter of the generator network is fixed, and the sample triplet is inputted into the face swap model. After outputting the swapped face image, the server updates the network parameter of the discriminator network based on the image attribute discrimination result of the swapped face image and the image attribute discrimination result of the reference image respectively predicted by the discriminator network. In other words, the server constructs, when the network parameter of the generator network is fixed, the discrimination loss for the discriminator network based on the first probability that the swapped face image is a non-forged image and the second probability that the reference image is a non-forged image, and updates the network parameter of the discriminator network based on the discrimination loss.

In one embodiment, the discrimination loss for the discriminator network may be represented by the following formula:

$$\text{D\_Loss} = -\log D(GT) - \log(1 - D(\text{fake})).$$

D represents the discriminator network, GT is the reference image, fake is the swapped face image, D(fake) represents the first probability that the swapped face image is a non-forged image, and D(GT) represents the second probability that the reference image is a non-forged image.

A training goal of the second stage is to allow the swapped face image outputted by the generator network to "deceive" the discriminator network as much as possible, so that the discriminator network predicts the swapped face image as a non-forged image. Therefore, at the second stage, the parameter of the discriminator network is fixed, and the same batch of sample triplet is inputted into the face swap model. After the swapped face image is outputted by using the generator network, a loss function for training the generator network is constructed based on the image attribute discrimination result of the swapped face image and the image attribute discrimination result of the reference image that are predicted by the discriminator network, and the network parameter of the generator network is updated based on the loss function.

In one embodiment, at the second stage, in the loss function for training the generator network, in addition to the generation loss for the generator network, the server also introduces the expression loss and the identity loss. Specifically, the server extracts a feature from the swapped face image by using the expression recognition network of the face swap model to obtain the expression feature of the swapped face image, and extracts a feature from the swapped face image by using the face recognition network of the face swap model to obtain the identity feature of the swapped face image. Both the expression recognition network and the face recognition network are pre-trained neural network models.

Therefore, at the second stage, the server may construct the generation loss for the generator network based on the first probability that the swapped face image is a non-forged image, construct the expression loss based on the difference between the expression feature of the swapped face image and the expression feature of the template image, construct the identity loss based on the difference between the identity feature of the swapped face image and the identity feature of the source face image, construct the face swap loss for the generator network based on the generation loss, the expression loss, and the identity loss, and update the network parameter of the generator network based on the face swap loss.

In an embodiment, the generation loss for the generator network may be represented by the following formula:

$$\text{G\_Loss} = \log(1 - D(\text{fake})).$$

In an embodiment, the expression loss for the generator network may be represented by the following formula:

$$\text{Exp\_features\_loss} = (\text{template\_exp\_features} - \text{fake\_exp\_features})^2.$$

template_exp_features is the expression feature of the template image, and fake_exp_features is the expression feature of the swapped face image.

In an embodiment, the identity loss for the generator network may be represented by the following formula:

$$\text{ID\_loss}=1-\text{cosine\_similarity}(\text{fake\_id\_featues},\text{souce\_id\_\_features}).$$

cosine_similarity ( ) is a cosine similarity, fake_id_features is the identity feature of the swapped face image, and source_id_features is the identity feature of the source face image.

Figure 5:
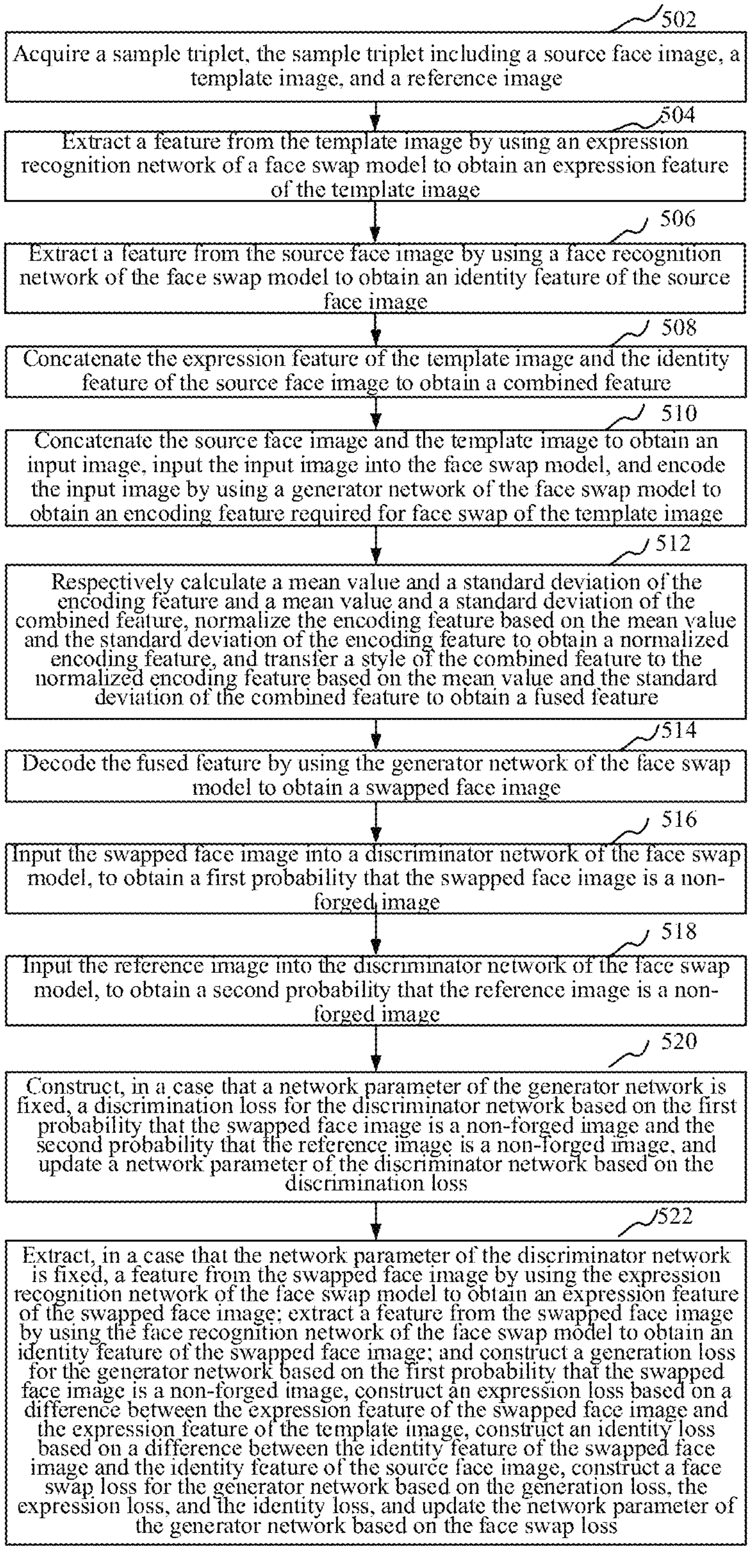
FIG. 5 is a schematic flowchart of a method for training a face swap model according to an embodiment of the present disclosure.

FIG. 5 is a schematic flowchart of a method for training a face swap model according to an embodiment. The method may be performed by a computer device, and specifically includes the following operations.

Operation 502: Acquire a sample triplet, the sample triplet including a source face image, a template image, and a reference image.

Operation 504: Extract a feature from the template image by using an expression recognition network of the face swap model to obtain an expression feature of the template image.

Operation 506: Extract a feature from the source face image by using a face recognition network of the face swap model to obtain an identity feature of the source face image.

Operation 508: Concatenate the expression feature of the template image and the identity feature of the source face image to obtain a combined feature.

Operation 510: Concatenate the source face image and the template image to obtain an input image, input the input image into the face swap model, and encode the input image by using a generator network of the face swap model to obtain an encoding feature required for face swap of the template image.

Operation 512: Respectively calculate a mean value and a standard deviation of the encoding feature and a mean value and a standard deviation of the combined feature, normalize the encoding feature based on the mean value and the standard deviation of the encoding feature to obtain a normalized encoding feature, and transfer a style of the combined feature to the normalized encoding feature based on the mean value and the standard deviation of the combined feature to obtain a fused feature.

Operation 514: Decode the fused feature by using the generator network of the face swap model to obtain a swapped face image.

Operation 516: Input the swapped face image into a discriminator network of the face swap model, to obtain a first probability that the swapped face image is a non-forged image.

Operation 518: Input the reference image into the discriminator network of the face swap model, to obtain a second probability that the reference image is a non-forged image.

Operation 520: Construct, when a network parameter of the generator network is fixed, a discrimination loss for the discriminator network based on the first probability that the swapped face image is a non-forged image and the second probability that the reference image is a non-forged image, and update a network parameter of the discriminator network based on the discrimination loss.

Operation 522: Extract, when the network parameter of the discriminator network is fixed, a feature from the swapped face image by using the expression recognition network of the face swap model to obtain an expression feature of the swapped face image; extract a feature from the swapped face image by using the face recognition network of the face swap model to obtain an identity feature of the swapped face image; and construct a generation loss for the generator network based on the first probability that the swapped face image is a non-forged image, construct an expression loss based on a difference between the expression feature of the swapped face image and the expression feature of the template image, construct an identity loss based on a difference between the identity feature of the swapped face image and the identity feature of the source face image, construct a face swap loss for the generator network based on the generation loss, the expression loss, and the identity loss, and update the network parameter of the generator network based on the face swap loss.

In the method for training a face swap model, during training the face swap model, an encoding feature of the template image and an encoding feature of the source face image participate in decoding to output the swapped face image, and the expression feature of the template image and the identity feature of the source face image also participate in decoding to output the swapped face image, so that the outputted swapped face image can have both expression information of the template image and identity information of the source face image. In other words, in addition to retaining an expression of the template image, the swapped face image can also be similar to the source face image. In addition, the face swap model is updated based on the difference between the expression feature of the template image and the expression feature of the swapped face image, and the difference between the identity feature of the source face image and the identity feature of the swapped face image. The difference between the expression feature of the template image and the expression feature of the swapped face image may constrain an expression similarity between the swapped face image and the template image, and the difference between the identity feature of the source face image and the identity feature of the swapped face image may constrain an identity similarity between the swapped face image and the source face image. In this way, even if the expression of the template image is complex, the outputted swapped face image can still retain this complex expression, thereby improving a face swap effect. Moreover, when the network parameter of the generator network and the network parameter of the discriminator network of the face swap model are updated, the generator network and the discriminator network may be allowed, based on an image attribute discrimination result of the swapped face image and an image attribute discrimination result of the reference image that are predicted by the discriminator network, to perform adversarial training, thereby improving overall image quality of the swapped face image outputted by the face swap model.

Figure 6:
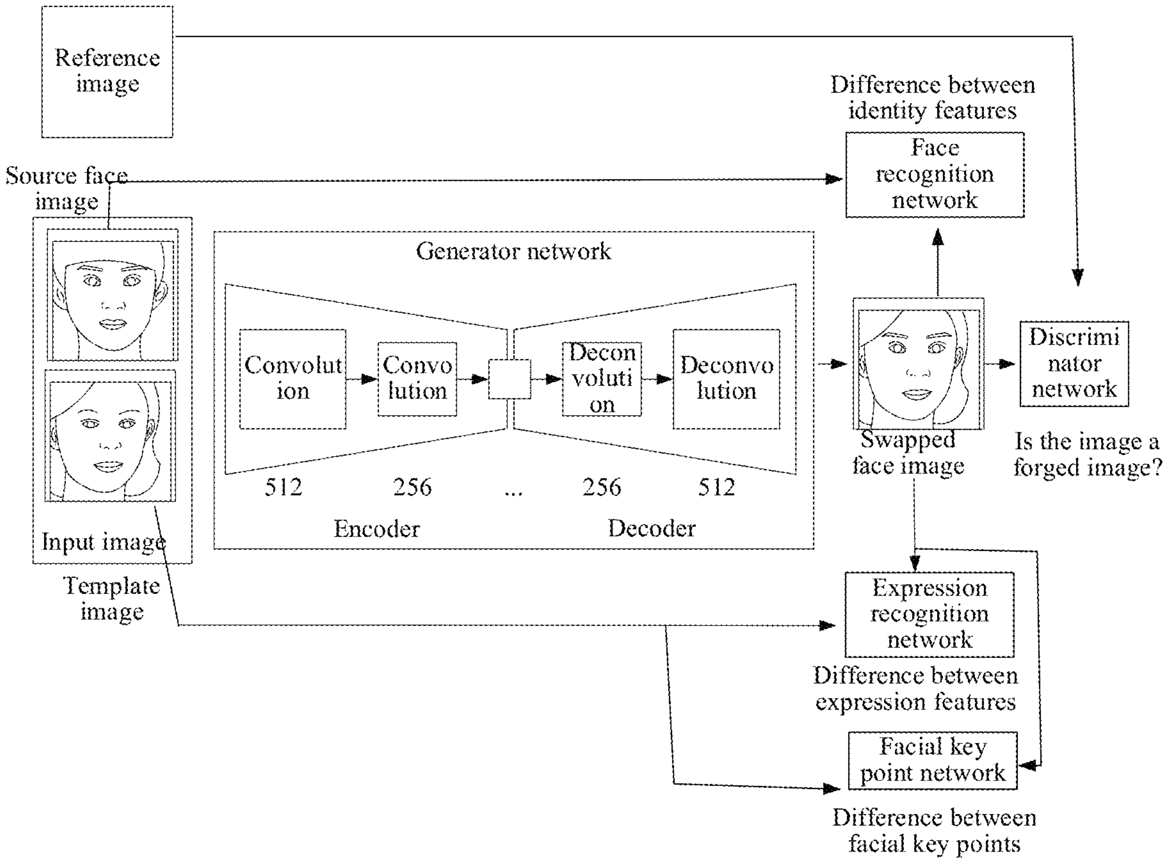
FIG. 6 is a schematic diagram of a framework for training a face swap model according to an embodiment of the present disclosure.

In an embodiment, as shown in FIG. 6, the present disclosure also introduces a pre-trained facial key point network during training the face swap model, and the generator network of the face swap model is trained based on a difference between facial key point information of the template image and facial key point information of the swapped face image. Specifically, the foregoing method may further include: respectively recognizing facial key points in the template image and facial key points in the swapped face image by using the pre-trained facial key point network to obtain the facial key point information of the template image and the facial key point information of the swapped face image; and constructing a key point loss based on the difference between the facial key point information of the template image and the facial key point information of the swapped face image. The key point loss is configured for participating in the training for the generator network of the face swap model.

When a facial expression in the template image is special and complex, to better achieve an effect that the generated swapped face image can still retain the complex expression, in one embodiment, in the present disclosure, the facial key point network is further introduced during training the face swap model. The facial key point network may locate positions of facial key points in an image, and then construct the key point loss based on the difference between the facial key point information of the template image and the facial key point information of the swapped face image. The key point loss participates in the training of the generator network to ensure expression consistency of the template image and the swapped face image.

Figure 7:
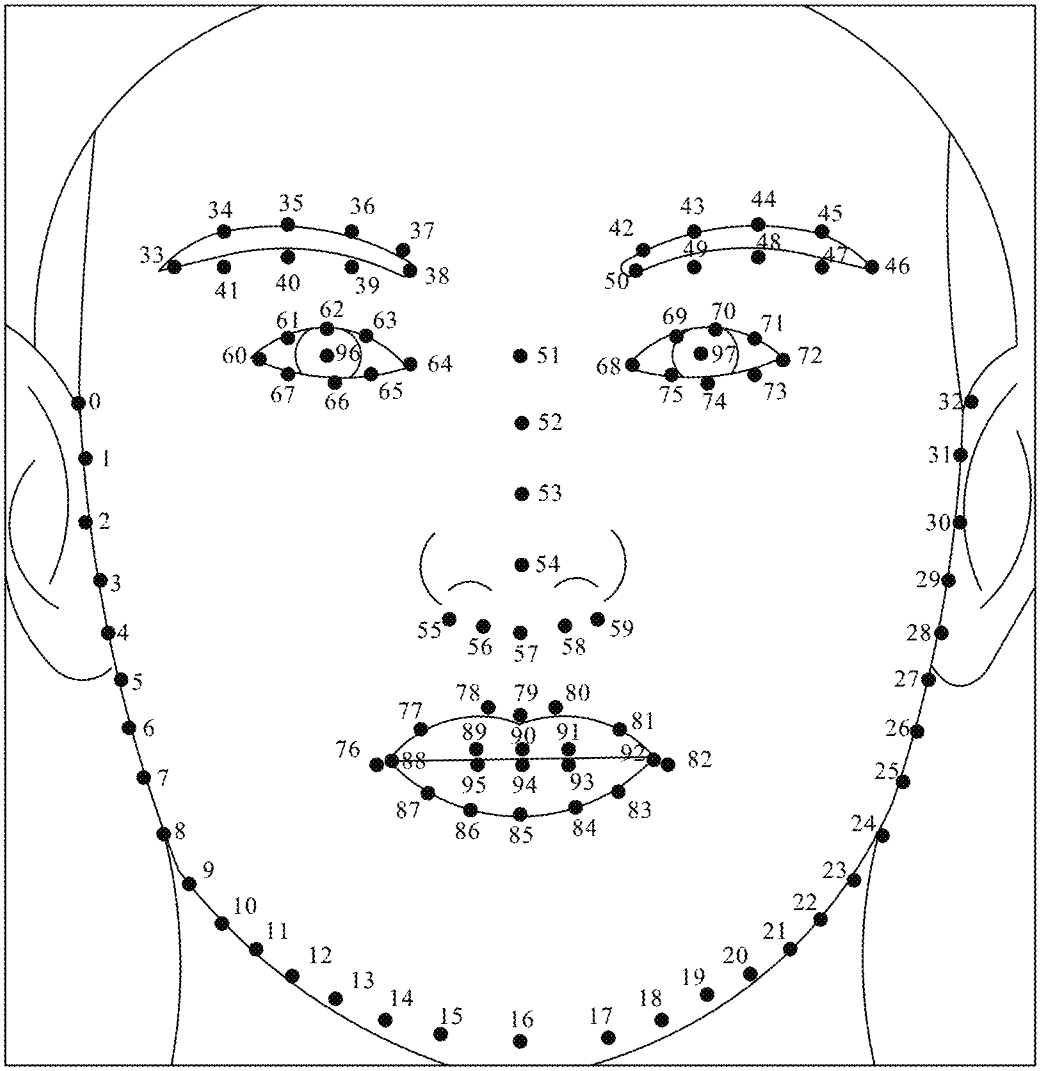
FIG. 7 is a schematic diagram of facial key points according to an embodiment of the present disclosure.

The facial key points are pixels of facial features related to facial expressions on the face in the image, such as pixels of the eyebrows, the mouth, the eyes, the nose, and the facial contour. FIG. 7 is a schematic diagram of facial key points according to an embodiment. In FIG. 7, 97 facial key points are shown, where points 0-32 are key points of the facial contour, points 33-50 are key points of the eyebrow contours, points 51-59 are key points of the nose, points 60-75 are key points of the eye contours, points 76-95 are key points of the mouth contour, and points 96 and 97 are key points of pupils. Certainly, the facial key point network may further locate more facial key points, for example, 256 facial key points.

Facial key point detection is a processing process of locating facial key points of a face based on an inputted face area. Affected by factors such as light, a block, and a posture, the facial key point detection may be a challenging task.

In an embodiment, the server respectively locates the facial key points in the swapped face image and the facial key points in the template image by using the pre-trained facial key point network. For some or all of the facial key points, the server calculates squares of differences between feature values based on the feature values of the same facial key point corresponding to the swapped face image and the template image, and then calculates a sum, which is denoted as the key point loss landmark_loss. During training, a smaller key point loss is better. For example, for the $95^{th}$ key point, a square of a difference is calculated based on feature values of the $95^{th}$ facial key point corresponding to the expression feature fake_landmark of the swapped face image and the expression feature template landmark of the template image. A sum of the facial key points calculated in this way is the key point loss. Certainly, in some embodiments, the server may alternatively represent an expression difference between the swapped face image and the template image based on only differences between feature values of key points of the eyebrows, the mouth, and the eyes.

A network structure of the facial key point network is not limited in embodiments of the present disclosure. In one embodiment, the facial key point network may be built based on a convolutional neural network. For example, a three-layer concatenated convolutional neural network is designed and a feature extraction capability of multi-layer convolutions is used to gradually obtain a precise feature from rough to precise, and then a fully connection layer is used to predict the positions of the facial key points. When the facial key point network is trained, a sample face image dataset needs to be acquired, in which each image has corresponding key point annotation information, in other words, position data of facial key points. A sample face image is inputted into the facial key point network to output predicted positions of key points by using the facial key point network, differences between annotation positions and the predicted positions of the key points are calculated, and differences corresponding to all the key points are summed up to obtain a predicted difference of the entire sample face image. A loss function is constructed based on the predicted difference, and a network parameter of the facial key point network is optimized by minimizing the loss function.

In this embodiment, during training the face swap model, the facial key point network and the key point loss are introduced, so that the trained generator network of the face swap model can output a swapped face image having a good expression retention effect.

Figure 8:
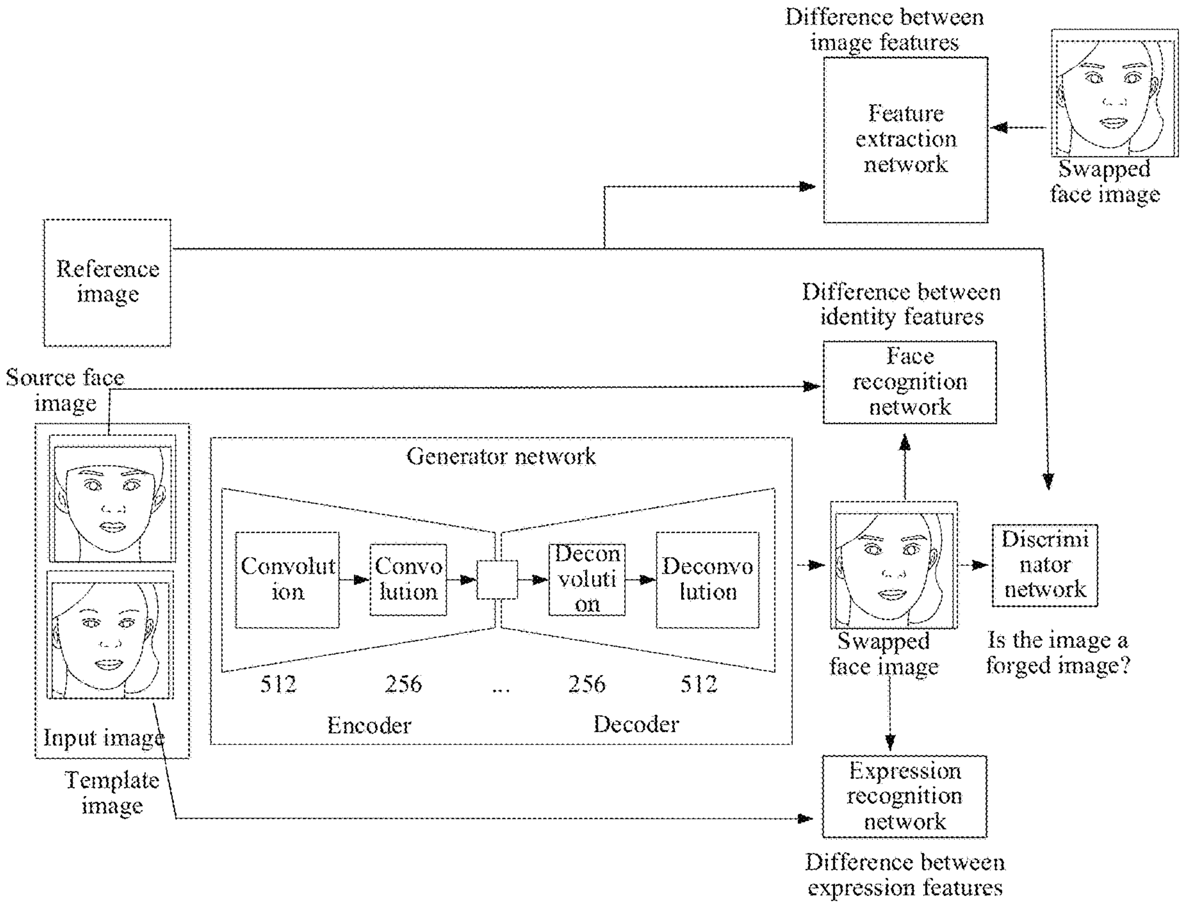
FIG. 8 is a schematic diagram of a framework for training a face swap model according to another embodiment of the present disclosure.

In an embodiment, as shown in FIG. 8, the present disclosure also introduces a pre-trained feature extraction network during training the face swap model, and the generator network of the face swap model is trained based on a difference between an image feature of the template image and an image feature of the swapped face image. Specifically, the foregoing method may further include: respectively extracting the image feature from the swapped face image and the image feature from the reference image by using the pre-trained feature extraction network to obtain the image feature of the swapped face image and the image feature of the reference image; and constructing a similarity loss based on the difference between the image feature of the swapped face image and the image feature of the reference image. The similarity loss is configured for participating in the training for the generator network of the face swap model.

In this embodiment, to measure a difference between the swapped face image and the reference image at a feature level, and to allow that the feature of the generated swapped face image is similar to that of the reference image, during training the face swap model, the similarity loss is further introduced. The similarity loss may be, for example, a learned perceptual image patch similarity (LPIPS). The pre-trained feature extraction network is configured to respectively extract features of the swapped face image and features of the reference image at different layers, compare feature differences between the swapped face image and the reference image at the same layer, and construct the similarity loss. During training, a smaller feature difference between the swapped face image and the reference image is better. A network structure of the feature extraction network is not limited in embodiments of the present disclosure.

Figure 9:
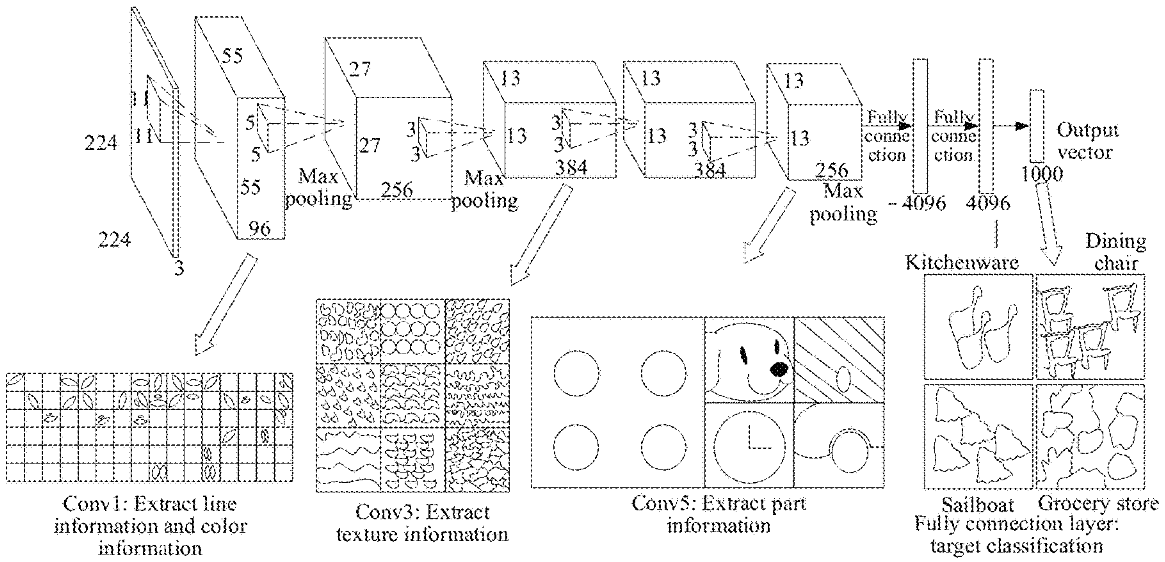
FIG. 9 is a schematic diagram of a feature extraction network according to an embodiment of the present disclosure.

FIG. 9 is a schematic diagram of a feature extraction network according to an embodiment. Refer to FIG. 9. During feature extraction, a deeper layer indicates a less feature resolution. A feature at a low layer may represent a low-layer feature such as a line or a color, and a feature at a high layer may represent a high-layer feature such as a part or an object. Image features extracted from two images are compared to measure an overall similarity of the two images.

FIG. 9 shows feature visualization at different network layers. The feature extraction network includes five convolution operations. A resolution of an input image is 224*224*3. A first-layer image feature is extracted through a first-layer convolution operation Conv1, denoted as fake_fea1, with a resolution of 55*55*96. A second-layer image feature is extracted through a second-layer convolution operation Conv2 and a pooling operation, denoted as fake_fea2, with a resolution of 27*27*256. A third-layer image feature is extracted after a third-layer convolution operation Conv3 and a pooling operation, denoted as fake_fea3, with a resolution of 13*13*384. Then, an image feature is obtained through a fourth-layer convolution operation Conv5 and a pooling operation, denoted as fake_fea4, with a resolution of 13*13*256. Finally, an output vector with a dimension of 1000 is obtained through a fully connection layer for image classification or target detection.

In an embodiment, the image feature extracted by the server from the swapped face image by using the feature extraction network may be denoted as:

$$\text{feature(fake)} = (\text{fake\_fea1}, \text{fake\_fea2}, \text{fake\_fea3}, \text{fake\_fea4}).$$

Similarity, the image feature extracted by the server from the reference image by using the feature extraction network may be denoted as:

$$\text{feature}(GT) = (\text{GT\_fea1}, \text{GT\_fea2}, \text{GT\_fea3}, \text{GT\_fea4}).$$

The similarity loss may be represented by the following formula:

$$\text{LPIPS\_Loss} = \sum_{i}^{4} |\text{fake\_feai} - \text{GT\_feai}|.$$

In this embodiment, during training the face swap model, the similarity loss is constructed based on the similarity between the feature of the swapped face image and the feature of the reference image, and the similarity loss participates in the training of the generator network of the face swap model, so that the trained generator network of the face swap model can output a swapped face image with a vivid face swap effect.

In an embodiment, the present disclosure also introduces a reconstruction loss during training the face swap model, and the reconstruction loss is constructed based on a pixel-level difference between the reference image and the swapped face image to train the generator network of the face swap model. Specifically, the foregoing method may further include: constructing the reconstruction loss based on the pixel-level difference between the swapped face image and the reference image. The reconstruction loss is configured for participating in the training for the generator network of the face swap model. During training, a smaller pixel-level difference between the swapped face image and the reference image is better. The reconstruction loss may be represented by the following formula:

$$\text{Reconstruction\_loss} = |\text{fake} - \text{GT}|.$$

This formula represents a difference between a swapped face image fake and a reference image GT of the same size. Specifically, the server may calculate a difference of pixel values corresponding to the same pixel position of the two images, sum up differences of all pixel positions, to obtain an overall difference between the two images at an image pixel level. The reconstruction loss may be constructed based on the overall difference.

During training the face swap model, at a training stage of the generator network, the foregoing generation loss, expression loss, identity loss, key point loss, similarity loss, and reconstruction loss may all be introduced to construct the overall face swap loss for the generator network, so that a good face swap effect for complex expression retention can be achieved through these constraints in various aspects.

Figure 10:
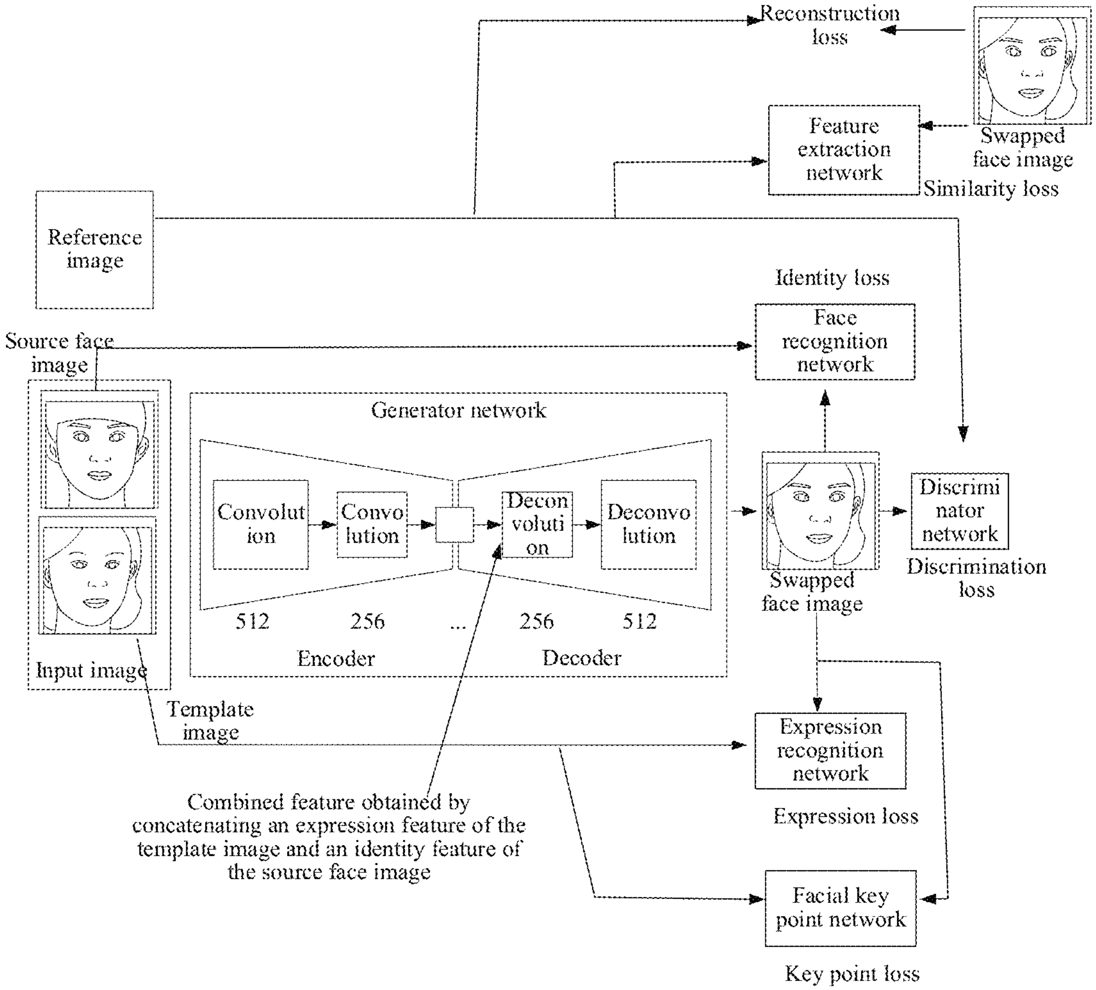
FIG. 10 is a schematic diagram of a framework for training a face swap model according to another embodiment of the present disclosure.

FIG. 10 is a schematic diagram of a training architecture of a face swap model according to a specific embodiment. Refer to FIG. 10. Networks introduced during training the face swap model include: a generator network, a discriminator network, an expression recognition network, a face recognition network, a facial key point network, and a feature extraction network. A process for training the face swap model is described below with reference to FIG. 10.

A server obtains a training sample, where the training sample includes a plurality of sample triplets, and the sample triplet includes a source face image, a template image, and a reference image.

Then, the server extracts a feature from the template image by using a pre-trained expression recognition network to obtain an expression feature of the template image. The server extracts a feature from the source face image by using a pre-trained face recognition network to obtain an identity feature of the source face image, and concatenates the expression feature of the template image and the identity feature of the source face image to obtain a combined feature.

Then, the server further concatenates the source face image and the template image to obtain an input image, inputs the input image into the face swap model, and encodes the input image by using the generator network of the face swap model to obtain an encoding feature required for face swap on the template image.

Then, the server fuses the encoding feature and the combined feature to obtain a fused feature, and performs decoding based on the fused feature by using the generator network of the face swap model to obtain a swapped face image.

Then, the server inputs the swapped face image into the discriminator network of the face swap model, to obtain a first probability that the swapped face image is a non-forged image, and inputs the reference image into the discriminator network of the face swap model, to obtain a second probability that the reference image is a non-forged image.

Then, the server constructs, when a network parameter of the generator network is fixed, a discrimination loss for the discriminator network based on the first probability that the swapped face image is a non-forged image and the second probability that the reference image is a non-forged image, and updates a network parameter of the discriminator network based on the discrimination loss.

Then, when the network parameter of the discriminator network is fixed, the server re-inputs the swapped face image into an updated discriminator network to obtain the first probability that the swapped face image is a non-forged image, and constructs a generation loss for the generator network based on the first probability that the swapped face image is a non-forged image. The server extracts a feature from the swapped face image by using the expression recognition network of the face swap model to obtain an expression feature of the swapped face image, and constructs an expression loss based on a difference between the expression feature of the swapped face image and the expression feature of the template image. The server extracts a feature from the swapped face image by using the face recognition network of the face swap model to obtain an identity feature of the swapped face image, and constructs an identity loss based on a difference between the identity feature of the swapped face image and the identity feature of the source face image. The server respectively recognizes facial key points in the template image and facial key points in the swapped face image by using a pre-trained facial key point network to obtain facial key point information of the template image and facial key point information of the swapped face image, and constructs a key point loss based on a difference between the facial key point information of the template image and the facial key point information of the swapped face image. The server respectively extracts an image feature from the swapped face image and an image feature from the reference image by using a pre-trained feature extraction network to obtain the image feature of the swapped face image and the image feature of the reference image, and constructs a similarity loss based on a difference between the image feature of the swapped face image and the image feature of the reference image. The server constructs a reconstruction loss based on a pixel-level difference between the swapped face image and the reference image. Finally, a face swap loss for the generator network is constructed based on the generation loss, the expression loss, the identity loss, the key point loss, the similarity loss, and the reconstruction loss, and the network parameter of the generator network is updated based on the face swap loss.

According to this alternate training manner, when a training stop condition is satisfied, a trained face swap model can be obtained.

In an embodiment, after obtaining the trained face swap model, the server may use the generator network, the pre-trained expression recognition network and face recognition network in the trained face swap model to perform face swap on a target image or a target video to obtain a swapped face image or a swapped face video.

In an example in which face swap is performed on the target video, the following operations are included: video collection, image input, face detection, cropping a face area, video face swap with expression optimization, and result display.

Figure 11:
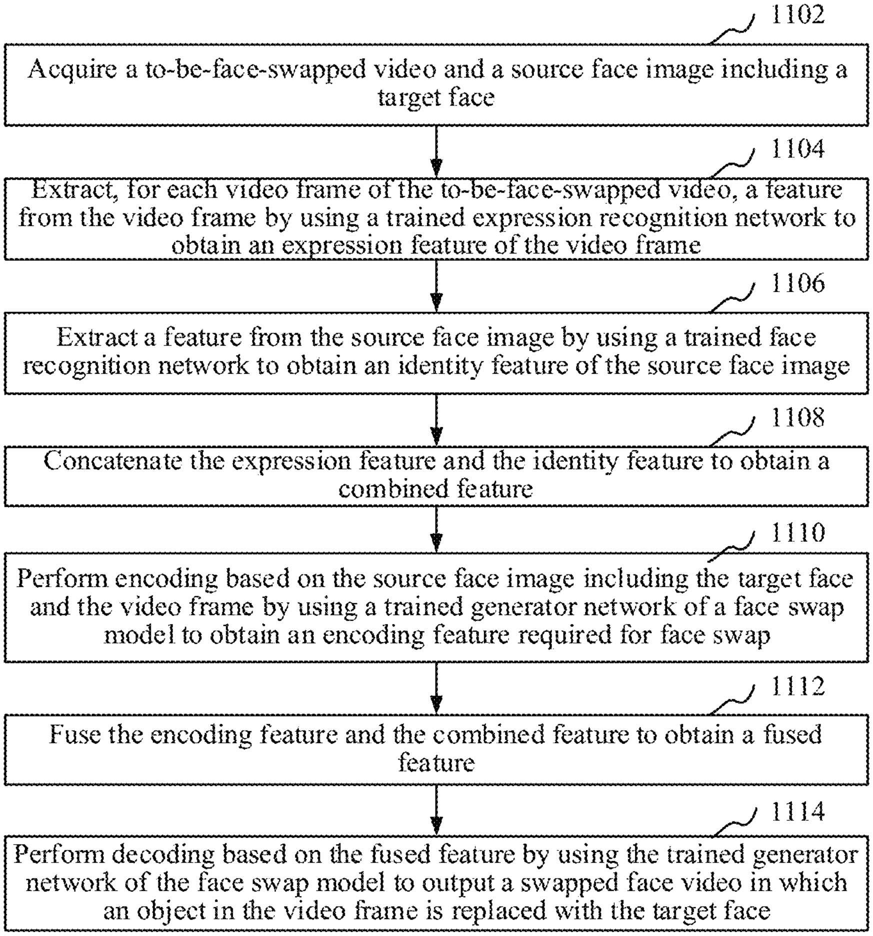
FIG. 11 is a schematic flowchart of video face swap according to an embodiment of the present disclosure.

FIG. 11 is a schematic flowchart of video face swap according to an embodiment. This embodiment may be performed by a computer device or a computer device cluster including a plurality of computer devices. The computer device may be a server, or may be a terminal. Refer to FIG. 11. The following operations are included.

Operation 1102: Acquire a to-be-face-swapped video and a source face image including a target face.

The source face image may be an original image including a face, or may be a cropped image including only a face obtained by performing face detection and configuration on the original image.

Operation 1104: Extract, for each video frame of the to-be-face-swapped video, a feature from the video frame by using a trained expression recognition network to obtain an expression feature of the video frame.

The server may directly perform subsequent processing on the video frame, or perform face detection and configuration on the video frame to obtain a cropped image including only a face.

Operation 1106: Extract a feature from the source face image by using a trained face recognition network to obtain an identity feature of the source face image.

Operation 1108: Concatenate the expression feature and the identity feature to obtain a combined feature.

Operation 1110: Perform encoding based on the source face image including the target face and the video frame by using a trained generator network of the face swap model to obtain an encoding feature required for face swap.

Operation 1112: Fuse the encoding feature and the combined feature to obtain a fused feature.

Operation 1114: Perform decoding based on the fused feature by using the trained generator network of the face swap model to output a swapped face video in which an object in the video frame is replaced with the target face.

Figure 12:
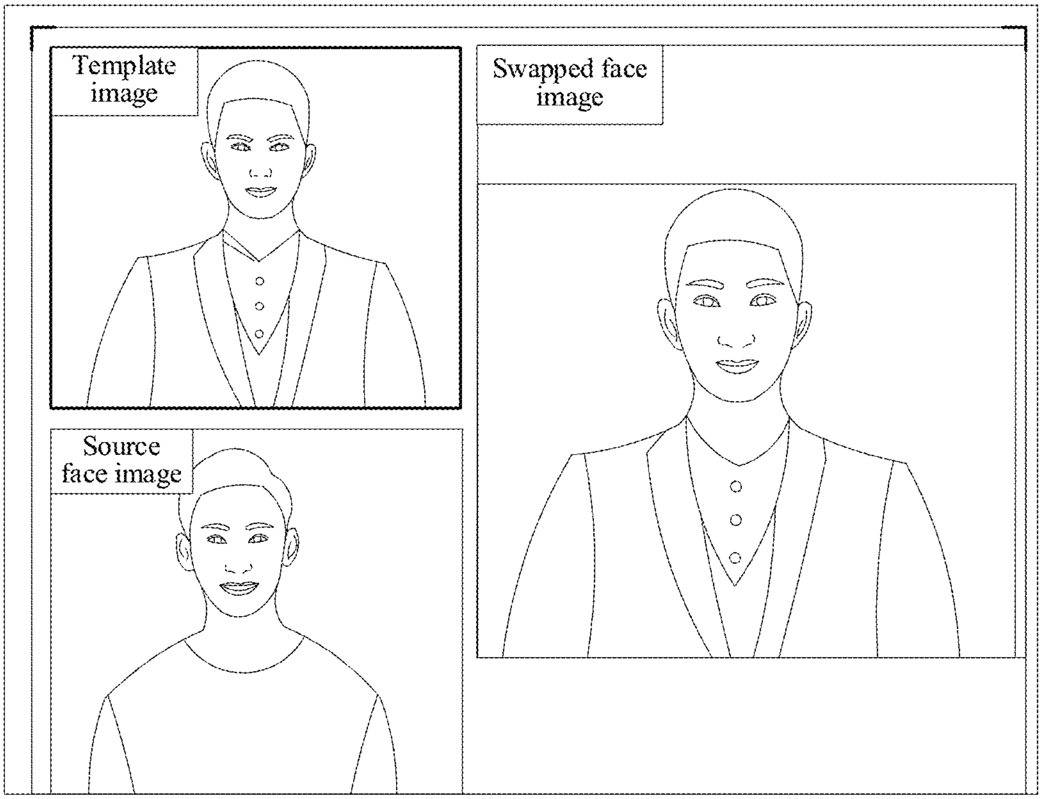
FIG. 12 is a schematic diagram of an effect of performing face swap on a photo according to an embodiment of the present disclosure.

FIG. 12 is a schematic diagram of an effect of performing face swap on a photo according to an embodiment. A face swap model trained by using the method for training a face swap model provided in embodiments of the present disclosure can still retain a good face swap effect even an expression is complex, and may be used in various scenarios such as ID photo production, film and television portrait production, game character design, a virtual image, and privacy protection. The face swap module can still retain the facial expression in the template image even the expression is complex, and may further satisfy face swap needs in some complex expression scenarios in film and television. In addition, in a video scenario, the expression is retained smoothly and naturally.

Although various operations in flowcharts according to each embodiment are displayed in sequence based on indication of arrows, the operations are not necessarily performed in sequence based on a sequence indicated by the arrows. Unless otherwise explicitly specified in the present disclosure, the execution sequence of these operations is not strictly limited, and the operations may be performed in other sequences. In addition, at least some of the operations in the flowcharts according to each embodiment may include a plurality of operations or a plurality of stages. These operations or stages are not necessarily performed at a same time instant, but may be performed at different time instants. These operations or stages are not necessarily performed in sequence, and the operations or stages may be performed in turn or alternately with other operations or at least some operations or stages of other operations.

Based on the same inventive concept, an embodiment of the present disclosure further provides an apparatus for training a face swap model for implementing the foregoing method for training a face swap model. An implementation for resolving problems provided in the apparatus is similar to the implementation described in the foregoing method. Therefore, for specific limitations of the following one or more embodiments of the apparatus for training a face swap model, reference may be made to the foregoing limitations to the method for training a face swap model. Details are not described herein again.

Figure 13:
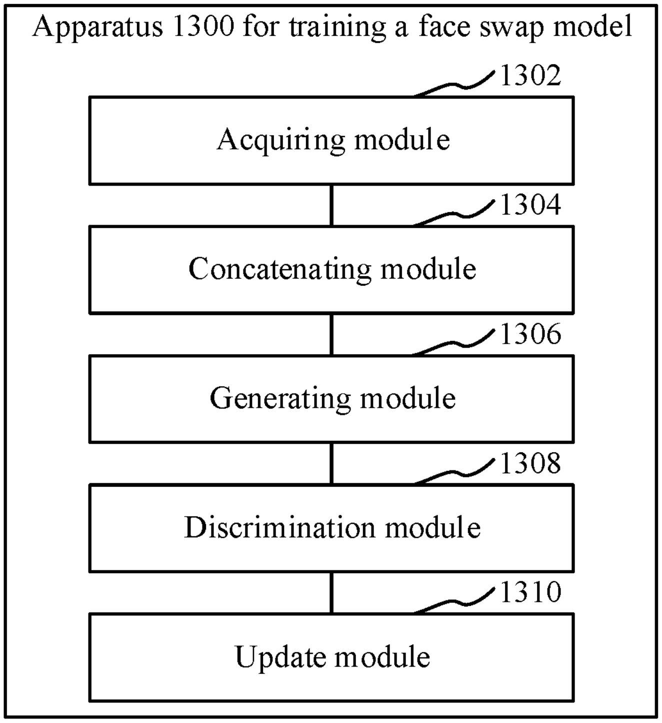
FIG. 13 is a block diagram of a structure of an apparatus for training a face swap model according to an embodiment of the present disclosure.

In an embodiment, as shown in FIG. 13, an apparatus 1300 for training a face swap model is provided. The apparatus includes: an acquiring module 1302, a concatenating module 1304, a generating module 1306, a discrimination module 1308, and an update module 1310.

The acquiring module 1302 is configured to acquire a sample triplet, the sample triplet including a source face image, a template image, and a reference image.

The concatenating module 1304 is configured to concatenate an expression feature of the template image and an identity feature of the source face image to obtain a combined feature.

The generating module 1306 is configured to perform encoding based on the source face image and the template image by using a generator network of the face swap model to obtain an encoding feature required for face swap, fuse the encoding feature and the combined feature to obtain a fused feature, and perform decoding based on the fused feature by using the generator network of the face swap model to obtain a swapped face image.

The discrimination module 1308 is configured to respectively predict an image attribute discrimination result of the swapped face image and an image attribute discrimination result of the reference image by using a discriminator network of the face swap model, an image attribute including forged and non-forged.

The update module 1310 is configured to calculate a difference between an expression feature of the swapped face image and the expression feature of the template image, calculate a difference between an identity feature of the swapped face image and the identity feature of the source face image, and update the generator network and the discriminator network based on the image attribute discrimination result of the swapped face image and the image attribute discrimination result of the reference image, the calculated difference between the expression features, and the calculated difference between the identity features.

In an embodiment, the acquiring module 1302 is further configured to: acquire a first image and a second image, the first image and the second image corresponding to a same identity attribute and corresponding to different non-identity attributes; acquire a third image, the third image and the first image corresponding to different identity attributes; replace an object in the second image with an object in the third image to obtain a fourth image; and construct a sample triplet by using the first image as a source face image, the fourth image as a template image, and the second image as a reference image.

In an embodiment, the apparatus 1300 for training a face swap model further includes:

- an expression recognition module, configured to extract a feature from the template image by using an expression recognition network of the face swap model to obtain the expression feature of the template image; and
- a face recognition module, configured to extract a feature from the source face image by using a face recognition network of the face swap model to obtain the identity feature of the source face image.

The expression recognition network and the face recognition network both are pre-trained neural network models.

In an embodiment, the generating module 1306 is further configured to: concatenate the source face image and the template image to obtain an input image; input the input image into the face swap model; and encode the input image by using the generator network of the face swap model to obtain the encoding feature required for face swap on the template image.

In an embodiment, the apparatus 1300 for training a face swap model further includes:

- a fusion module, configured to: respectively calculate a mean value and a standard deviation of the encoding feature and a mean value and a standard deviation of the combined feature; normalize the encoding feature based on the mean value and the standard deviation of the encoding feature to obtain a normalized encoding feature; and transfer a style of the combined feature to the normalized encoding feature based on the mean value and the standard deviation of the combined feature to obtain the fused feature.

In an embodiment, the discrimination module 1308 is further configured to: input the swapped face image into the discriminator network of the face swap model, to obtain a first probability that the swapped face image is a non-forged image; and input the reference image into the discriminator network of the face swap model, to obtain a second probability that the reference image is a non-forged image.

In an embodiment, the apparatus 1300 for training a face swap model further includes:

- the expression recognition module, configured to extract a feature from the swapped face image by using the expression recognition network of the face swap model to obtain the expression feature of the swapped face image; and
- the face recognition module, configured to extract a feature from the swapped face image by using the face recognition network of the face swap model to obtain the identity feature of the swapped face image.

The expression recognition network and the face recognition network both are pre-trained neural network models.

In an embodiment, the update module 1310 is further configured to: alternately construct, when a network parameter of the generator network is fixed, a discrimination loss for the discriminator network based on the first probability that the swapped face image is a non-forged image and the second probability that the reference image is a non-forged image, and update a network parameter of the discriminator network based on the discrimination loss; and construct, when the network parameter of the discriminator network is fixed, a generation loss for the generator network based on the first probability that the swapped face image is a non-forged image, construct an expression loss based on the difference between the expression feature of the swapped face image and the expression feature of the template image, construct an identity loss based on the difference between the identity feature of the swapped face image and the identity feature of the source face image, construct a face swap loss for the generator network based on the generation loss, the expression loss, and the identity loss, and update the network parameter of the generator network based on the face swap loss. This alternate process is ended when a training stop condition is satisfied, and a trained discriminator network and a trained generator network are obtained.

In an embodiment, the apparatus 1300 for training a face swap model further includes:

a key point positioning module, configured to respectively recognize facial key points in the template image and facial key points in the swapped face image by using a pre-trained facial key point network to obtain facial key point information of the template image and facial key point information of the swapped face image; and the update module 1310, further configured to construct a key point loss based on a difference between the facial key point information of the template image and the facial key point information of the swapped face image. The key point loss is configured for participating in the training for the generator network of the face swap model.

In an embodiment, the apparatus 1300 for training a face swap model further includes:

an image feature extraction module, configured to respectively extract an image feature from the swapped face image and an image feature of the reference image by using a pre-trained feature extraction network to obtain the image feature of the swapped face image and the image feature of the reference image; and the update module 1310, further configured to construct a similarity loss based on a difference between the image feature of the swapped face image and the image feature of the reference image. The similarity loss is configured for participating in the training for the generator network of the face swap model.

In an embodiment, the update module 1310 is further configured to construct a reconstruction loss based on a pixel-level difference between the swapped face image and the reference image. The reconstruction loss is configured for participating in the training for the generator network of the face swap model.

In an embodiment, the apparatus 1300 for training a face swap model further includes:

a face swap module, configured to: acquire a to-be-face-swapped video and a source face image including a target face; acquire, for each video frame of the to-be-face-swapped video, an expression feature of the video frame; acquire an identity feature of the source face image including the target face; concatenate the expression feature and the identity feature to obtain a combined feature; and perform encoding based on the source face image including the target face and the video frame by using the trained generator network of the face swap model to obtain an encoding feature required for face swap, perform decoding based on a fused feature obtained by fusing the encoding feature and the combined feature, and output a swapped face video in which an object in the video frame is replaced with the target face.

In the apparatus 1300 for training a face swap model, during training the face swap model, an encoding feature of the template image and an encoding feature of the source face image participate in decoding to output the swapped face image, and the expression feature of the template image and the identity feature of the source face image also participate in decoding to output the swapped face image, so that the outputted swapped face image can have both expression information of the template image and identity information of the source face image. In other words, in addition to retaining an expression of the template image, the swapped face image can also be similar to the source face image. In addition, the face swap model is updated based on the difference between the expression feature of the template image and the expression feature of the swapped face image, and the difference between the identity feature of the source face image and the identity feature of the swapped face image. The difference between the expression feature of the template image and the expression feature of the swapped face image may constrain an expression similarity between the swapped face image and the template image, and the difference between the identity feature of the source face image and the identity feature of the swapped face image may constrain an identity similarity between the swapped face image and the source face image. In this way, even if the expression of the template image is complex, the outputted swapped face image can still retain this complex expression, thereby improving a face swap effect. Moreover, when the network parameter of the generator network and the network parameter of the discriminator network of the face swap model are updated, the generator network and the discriminator network may be allowed, based on an image attribute discrimination result of the swapped face image and an image attribute discrimination result of the reference image that are predicted by the discriminator network, to perform adversarial training, thereby improving overall image quality of the swapped face image outputted by the face swap model.

All or some of modules in the apparatus 1300 for training a face swap model may be implemented by software, hardware, and a combination thereof. The foregoing modules may be embedded in hardware form or independent of a processor in a computer device, or may be stored in software form in a memory in the computer device, so that the processor may be called to perform operations corresponding to the foregoing modules.

The term module (and other similar terms such as submodule, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In an embodiment, a computer device is provided. The computer device may be a server or a terminal, and an internal structure diagram of the computer device may be shown in FIG. 14. The computer device includes a processor, a memory, an input/output interface (I/O for short), and a communication interface. The processor, the memory, and the input/output interface are connected via a system bus, and the communication interface is connected to the system bus via the input/output interface. The processor of the computer device is configured to provide a computing and control capabilities. The memory of the computer device includes a non-volatile storage medium and an internal memory. The non-volatile storage medium has an operating system, computer-readable instructions, and a database stored thereon. The internal memory provides a running environment for the operating system and the computer-readable instructions on the non-volatile storage medium. The input/output interface of the computer device is configured for information exchange between the processor and an external device. The communication interface of the computer device is configured to be connected to and communicate with the external device over a network. The computer-readable instructions, when executed by the processor, implement a method for training a face swap model.

Figure 14:
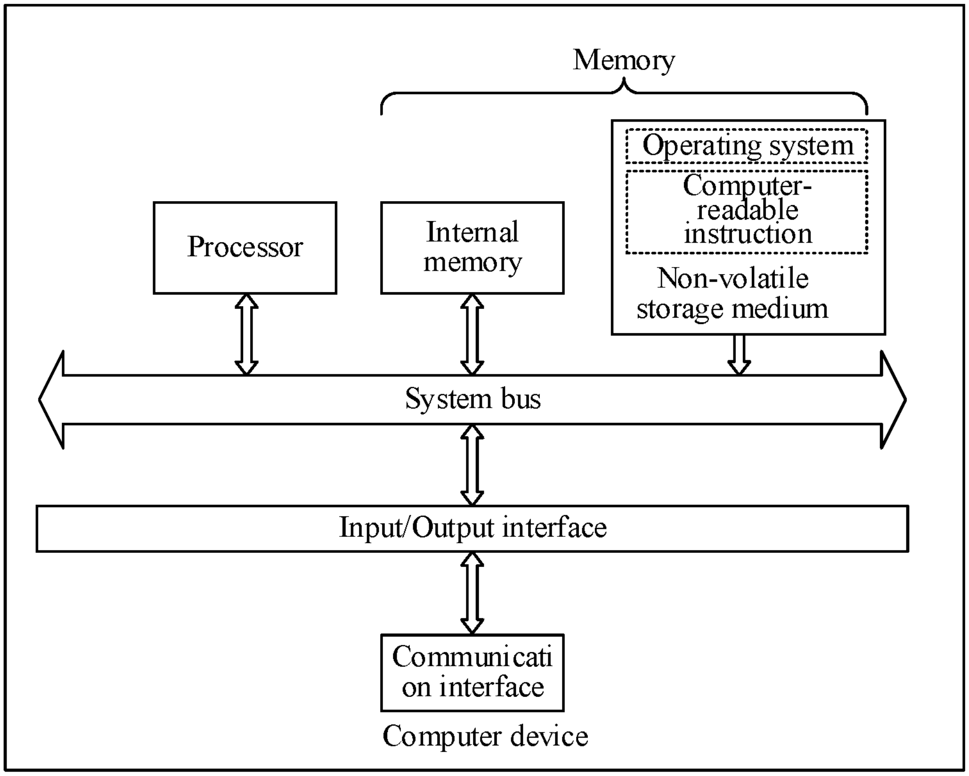
FIG. 14 is a diagram of an internal structure of a computer device according to an embodiment of the present disclosure.

A person skilled in the art may understand that the structure shown in FIG. 14 is only a block diagram of a partial structure related to a solution in the present disclosure, and does not constitute a limitation to the computer device to which the solution in the present disclosure is applied. Specifically, the computer device may include more components or fewer components than those shown in the figure, or some components may be combined, or a different component deployment may be used.

In an embodiment, a computer device is provided, including a memory and a processor. The memory has computer-readable instructions stored therein. The computer-readable instructions, when executed by the processor, implement operations of the method for training a face swap model provided in any one of embodiments of the present disclosure.

In an embodiment, a computer-readable storage medium is provided, having computer-readable instructions stored thereon. The computer-readable instructions, when executed by a processor, implement operations of the method for training a face swap model provided in any one of embodiments of the present disclosure.

In an embodiment, a computer program product is provided, including computer-readable instructions. The computer-readable instructions, when executed by a processor, implement operations of the method for training a face swap model provided in any one of embodiments of the present disclosure.

User information (including but not limited to user device information, user personal information, and the like) and data (including but not limited to data used for analysis, stored data, displayed data, and the like), included in the present disclosure are information and data that all authorized by a user or fully authorized by all parties. Collection, use, and processing of related data need to comply with relevant laws, regulations, and standards of relevant countries and regions.

A person of ordinary skill in the art may understand that all or some of procedures of the method in the foregoing embodiments may be implemented by computer-readable instructions instructing relevant hardware. The computer-readable instructions may be stored in a non-volatile computer-readable storage medium. When the computer-readable instructions are executed, the procedures of the method embodiments may be implemented. References to the memory, the database, or another medium used in embodiments provided in the present disclosure may all include at least one of a non-volatile memory or a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a grapheme memory, and the like. The volatile memory may include a random access memory (RAM), an external cache, or the like. As an illustration and not a limitation, the RAM may be in various forms, for example, a static random access memory (SRAM) or a dynamic random access memory (DRAM). The databases in embodiments of the present disclosure may include at least one of a relational database and a non-relational database. The non-relational database may include a blockchain-based distributed database and the like, which is not limited thereto. The processors in embodiments of the present disclosure may be a general-purpose processor, a central processing unit, a graphics processing unit, a digital signal processor, a programmable logic device, a data processing logic device based on quantum computing, and the like, which is not limited thereto.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments show only several implementations of the present disclosure. Descriptions of embodiments are described in detail and specifically, but not to be construed as a limitation to the patent scope of the present disclosure. For a person of ordinary skill in the art, several transformations and improvements may be made without departing from the idea of the present disclosure. These transformations and improvements belong to the protection scope of the present disclosure. Therefore, the protection scope of the present disclosure shall be subject to the appended claims.

What is claimed is:

1. A method for training a face swap model, performed by a computer device, the method comprising:

acquiring a sample triplet, the sample triplet comprising a source face image, a template image, and a reference image;

concatenating an expression feature of the template image and an identity feature of the source face image to obtain a combined feature;

performing encoding based on the source face image and the template image by using a generator network of the face swap model to obtain an encoding feature required for face swap;

fusing the encoding feature and the combined feature to obtain a fused feature, comprising: calculating a mean value and a standard deviation of the encoding feature, and calculating a mean value and a standard deviation of the combined feature; normalizing the encoding feature based on the mean value and the standard deviation of the encoding feature to obtain a normalized encoding feature; and transferring a style of the combined feature to the normalized encoding feature based on the mean value and the standard deviation of the combined feature to obtain the fused feature;

performing decoding based on the fused feature by using the generator network of the face swap model to obtain a swapped face image;

respectively predicting an image attribute discrimination result of the swapped face image and an image attribute discrimination result of the reference image by using a discriminator network of the face swap model, an image attribute comprising forged image and non-forged image; and calculating a difference between an expression feature of the swapped face image and the expression feature of the template image, calculating a difference between an identity feature of the swapped face image and an identity feature of the source face image, and updating the generator network and the discriminator network, based on the image attribute discrimination result of the swapped face image and the image attribute discrimination result of the reference image, the calculated difference of the expression features between the swapped face image and the template image, and the calculated difference of the identity features between the swapped face image and the source face image.

2. The method according to claim 1, wherein the acquiring of the sample triplet comprises:

acquiring a first image and a second image, the first image and the second image corresponding to a same identity attribute and corresponding to different non-identity attributes;

acquiring a third image, the third image and the first image corresponding to different identity attributes;

replacing an object in the second image with an object in the third image to obtain a fourth image; and constructing the sample triplet by using the first image as the source face image, the fourth image as the template image, and the second image as the reference image.

3. The method according to claim 1, further comprising:

extracting a feature from the template image by using an expression recognition network of the face swap model to obtain the expression feature of the template image; and extracting a feature from the source face image by using a face recognition network of the face swap model to obtain the identity feature of the source face image, the expression recognition network and the face recognition network both being pre-trained neural network models.

4. The method according to claim 1, wherein performing the encoding based on the source face image and the template image by using the generator network of the face swap model to obtain the encoding feature required for face swap comprises:

concatenating the source face image and the template image to obtain an input image;

inputting the input image into the face swap model; and encoding the input image by using the generator network of the face swap model to obtain the encoding feature required for face swap on the template image.

5. The method according to claim 1, wherein respectively predicting the image attribute discrimination result of the swapped face image and the image attribute discrimination result of the reference image by using the discriminator network of the face swap model comprises:

inputting the swapped face image into the discriminator network of the face swap model, and predicting a first probability that the swapped face image is a non-forged image by using the discriminator network; and inputting the reference image into the discriminator network of the face swap model, and predicting a second probability that the reference image is a non-forged image by using the discriminator network.

6. The method according to claim 1, wherein after the swapped face image is obtained, the method further comprises:

extracting a feature from the swapped face image by using the expression recognition network of the face swap model to obtain the expression feature of the swapped face image; and extracting a feature from the swapped face image by using the face recognition network of the face swap model to obtain the identity feature of the swapped face image, the expression recognition network and the face recognition network both being pre-trained neural network models.

7. The method according to claim 1, wherein updating the generator network and the discriminator network based on the image attribute discrimination result of the swapped face image and the image attribute discrimination result of the reference image, the calculated difference between the expression features, and the calculated difference between the identity features comprises:

alternately performing following operations till a training stop condition is satisfied and a trained discriminator network and a trained generator network are obtained:

constructing, when a network parameter of the generator network is fixed, a discrimination loss for the discriminator network based on a first probability that the swapped face image is a non-forged image and a second probability that the reference image is a non-forged image, and updating a network parameter of the discriminator network based on the discrimination loss; and constructing, when the network parameter of the discriminator network is fixed, a generation loss for the generator network based on the first probability that the swapped face image is a non-forged image, constructing an expression loss based on the difference between the expression feature of the swapped face image and the expression feature of the template image, constructing an identity loss based on the difference between the identity feature of the swapped face image and the identity feature of the source face image, constructing a face swap loss for the generator network based on the generation loss, the expression loss, and the identity loss, and updating the network parameter of the generator network based on the face swap loss.

8. The method according to claim 1, further comprising:

respectively recognizing facial key points in the template image and facial key points in the swapped face image by using a pre-trained facial key point network to obtain facial key point information of the template image and facial key point information of the swapped face image; and constructing a key point loss based on a difference between the facial key point information of the template image and the facial key point information of the swapped face image, the key point loss being configured for participating in training for the generator network of the face swap model.

9. The method according to claim 1, further comprising:

respectively extracting an image feature from the swapped face image and an image feature from the reference image by using a pre-trained feature extraction network to obtain the image feature of the swapped face image and the image feature of the reference image; and constructing a similarity loss based on a difference between the image feature of the swapped face image and the image feature of the reference image, the similarity loss being configured for participating in the training for the generator network of the face swap model.

10. The method according to claim 1, further comprising:

constructing a reconstruction loss based on a pixel-level difference between the swapped face image and the reference image, the reconstruction loss being configured for participating in the training for the generator network of the face swap model.

11. The method according to claim 1, further comprising:

acquiring a to-be-face-swapped video and a source face image comprising a target face;

acquiring, for each video frame of the to-be-face-swapped video, an expression feature of the video frame;

acquiring an identity feature of the source face image comprising the target face;

concatenating the expression feature and the identity feature to obtain a combined feature; and performing encoding based on the source face image comprising the target face and the video frame by using the trained generator network of the face swap model to obtain an encoding feature required for face swap, performing decoding based on a fused feature obtained by fusing the encoding feature and the combined feature, and outputting a swapped face video in which an object in the video frame is replaced with the target face.

12. A computer device, comprising:

one or more processors and a memory containing a computer-executable program that, when being executed, causes the one or more processors to perform:

acquiring a sample triplet, the sample triplet comprising a source face image, a template image, and a reference image;

concatenating an expression feature of the template image and an identity feature of the source face image to obtain a combined feature;

performing encoding based on the source face image and the template image by using a generator network of a face swap model to obtain an encoding feature required for face swap;

fusing the encoding feature and the combined feature to obtain a fused feature, comprising: calculating a mean value and a standard deviation of the encoding feature, and calculating a mean value and a standard deviation of the combined feature; normalizing the encoding feature based on the mean value and the standard deviation of the encoding feature to obtain a normalized encoding feature; and transferring a style of the combined feature to the normalized encoding feature based on the mean value and the standard deviation of the combined feature to obtain the fused feature;

performing decoding based on the fused feature by using the generator network of the face swap model to obtain a swapped face image;

respectively predicting an image attribute discrimination result of the swapped face image and an image attribute discrimination result of the reference image by using a discriminator network of the face swap model, an image attribute comprising forged image and non-forged image; and calculating a difference between an expression feature of the swapped face image and the expression feature of the template image, calculating a difference between an identity feature of the swapped face image and an identity feature of the source face image, and updating the generator network and the discriminator network, based on the image attribute discrimination result of the swapped face image and the image attribute discrimination result of the reference image, the calculated difference of the expression features between the swapped face image and the template image, and the calculated difference of the identity features between the swapped face image and the source face image.

13. The device according to claim 12, wherein the one or more processors are configured to perform:

acquiring a first image and a second image, the first image and the second image corresponding to a same identity attribute and corresponding to different non-identity attributes;

acquiring a third image, the third image and the first image corresponding to different identity attributes;

replacing an object in the second image with an object in the third image to obtain a fourth image; and constructing the sample triplet by using the first image as the source face image, the fourth image as the template image, and the second image as the reference image.

14. The device according to claim 12, wherein the one or more processors are configured to perform:

extracting a feature from the template image by using an expression recognition network of the face swap model to obtain the expression feature of the template image; and extracting a feature from the source face image by using a face recognition network of the face swap model to obtain the identity feature of the source face image, the expression recognition network and the face recognition network both being pre-trained neural network models.

15. The device according to claim 12, wherein the one or more processors are configured to perform:

concatenating the source face image and the template image to obtain an input image;

inputting the input image into the face swap model; and encoding the input image by using the generator network of the face swap model to obtain the encoding feature required for face swap on the template image.

16. The device according to claim 12, wherein the one or more processors are configured to perform:

inputting the swapped face image into the discriminator network of the face swap model, and predicting a first probability that the swapped face image is a non-forged image by using the discriminator network; and inputting the reference image into the discriminator network of the face swap model, and predicting a second probability that the reference image is a non-forged image by using the discriminator network.

17. The device according to claim 12, wherein the one or more processors are configured to perform:

extracting a feature from the swapped face image by using the expression recognition network of the face swap model to obtain the expression feature of the swapped face image; and extracting a feature from the swapped face image by using the face recognition network of the face swap model to obtain the identity feature of the swapped face image, the expression recognition network and the face recognition network both being pre-trained neural network models.

18. A non-transitory computer-readable storage medium, storing a computer-executable instruction that, when being executed, causes one or more processors to perform:

acquiring a sample triplet, the sample triplet comprising a source face image, a template image, and a reference image;

concatenating an expression feature of the template image and an identity feature of the source face image to obtain a combined feature;

performing encoding based on the source face image and the template image by using a generator network of the face swap model to obtain an encoding feature required for face swap;

fusing the encoding feature and the combined feature to obtain a fused feature, comprising: calculating a mean value and a standard deviation of the encoding feature, and calculating a mean value and a standard deviation of the combined feature; normalizing the encoding feature based on the mean value and the standard deviation of the encoding feature to obtain a normalized encoding feature; and transferring a style of the combined feature to the normalized encoding feature based on the mean value and the standard deviation of the combined feature to obtain the fused feature;

performing decoding based on the fused feature by using the generator network of the face swap model to obtain a swapped face image;

respectively predicting an image attribute discrimination result of the swapped face image and an image attribute discrimination result of the reference image by using a discriminator network of the face swap model, an image attribute comprising forged image and non-forged image; and calculating a difference between an expression feature of the swapped face image and the expression feature of the template image, calculating a difference between an identity feature of the swapped face image and an identity feature of the source face image, and updating the generator network and the discriminator network, based on the image attribute discrimination result of the swapped face image and the image attribute discrimination result of the reference image, the calculated difference of the expression features between the swapped face image and the template image, and the calculated difference of the identity features between the swapped face image and the source face image.

* * * * *